(12) United States Patent
Sasaki et al.

(10) Patent No.: US 12,018,128 B2
(45) Date of Patent: Jun. 25, 2024

(54) PARTICLE-DISPERSED POLYIMIDE PRECURSOR SOLUTION, METHOD FOR PRODUCING POROUS POLYIMIDE FILM, AND POROUS POLYIMIDE FILM

(71) Applicant: FUJIFILM Business Innovation Corp., Tokyo (JP)

(72) Inventors: Tomoya Sasaki, Kanagawa (JP); Hidekazu Hirose, Kanagawa (JP); Kosaku Yoshimura, Kanagawa (JP); Yasunobu Kashima, Kanagawa (JP); Hajime Sugahara, Kanagawa (JP); Kosuke Nakada, Kanagawa (JP); Tomoyo Okubo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 576 days.

(21) Appl. No.: 17/380,016

(22) Filed: Jul. 20, 2021

(65) Prior Publication Data
US 2022/0119596 A1    Apr. 21, 2022

(30) Foreign Application Priority Data
Oct. 21, 2020   (JP) .................... 2020-176681

(51) Int. Cl.
*C08G 73/10* (2006.01)
*C08J 5/18* (2006.01)
*C08J 9/26* (2006.01)

(52) U.S. Cl.
CPC ..... *C08G 73/1067* (2013.01); *C08G 73/1021* (2013.01); *C08G 73/1032* (2013.01);
(Continued)

(58) Field of Classification Search
CPC ............ C08G 73/1067; C08G 73/1042; C08G 73/1032; C08G 73/1021; C08J 5/18; C08J 9/26; C08J 2201/046; C08J 2379/08
(Continued)

(56) References Cited

U.S. PATENT DOCUMENTS 11,680,140 B2 *   6/2023   Sugahara ........... C08G 73/1028
                                                528/353
11,680,156 B2 *   6/2023   Kashima ................... C08L 1/10
                                                521/62
(Continued)

FOREIGN PATENT DOCUMENTS

JP      2005194318      7/2005
JP      2006104383      4/2006

*Primary Examiner* — Michael M. Bernshteyn
(74) *Attorney, Agent, or Firm* — JCIPRNET

(57) ABSTRACT

A particle-dispersed polyimide precursor solution contains a polyimide precursor having a unit represented by the following formula (I), particles, and a solvent, in which the particle-dispersed polyimide precursor solution satisfies both the following conditions (1) and (2),

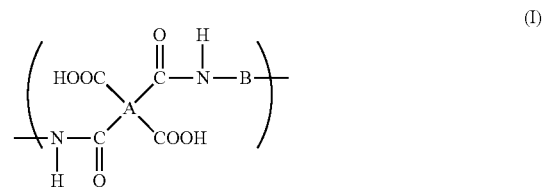

(in the formula (I), A represents a tetravalent organic group, and B represents a divalent organic group represented by any of the following formulas (B1) to (B4)), (Continued)

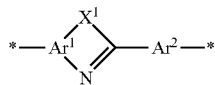

(B1)

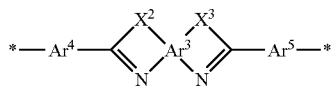

(B2)

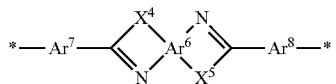

(B3)

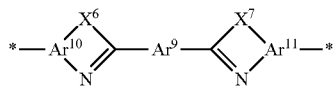

(B4)

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and $Ar^8$ each independently represent a divalent aromatic group which may have a substituent, $Ar^3$ and $Ar^6$ each independently represent a tetravalent aromatic group which may have a substituent or a group represented by the following formula (II), $Ar^9$ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

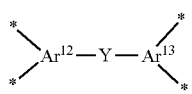 (II)

-continued

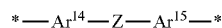 (III)

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, S(=O)$_2$, or CRbRc, Rb and Rc each independently represent a hydrogen atom, an alkyl group which may have a substituent, or an aryl group, and * represents a bonding site with an adjacent linking group), Condition (1): a total content of the groups represented by the formulas (B1) to (B4) is 1% by mass or more and 40% by mass or less with respect to a total amount of the polyimide precursor, and Condition (2): a content of the particles is 5% by mass or more and 90% by mass or less with respect to a total content of the polyimide precursor and the particles.

20 Claims, 1 Drawing Sheet

(52) U.S. Cl.
CPC ............ *C08G 73/1042* (2013.01); *C08J 5/18* (2013.01); *C08J 9/26* (2013.01); *C08J 2201/046* (2013.01); *C08J 2379/08* (2013.01)

(58) Field of Classification Search
USPC .......................................................... 521/62
See application file for complete search history.

(56) References Cited

U.S. PATENT DOCUMENTS

2016/0279883 A1* 9/2016 Nukada ................. B29C 67/202
2018/0244886 A1* 8/2018 Nukada ................. C08F 220/14
2021/0238392 A1* 8/2021 Kashima .................... C08J 9/26

* cited by examiner

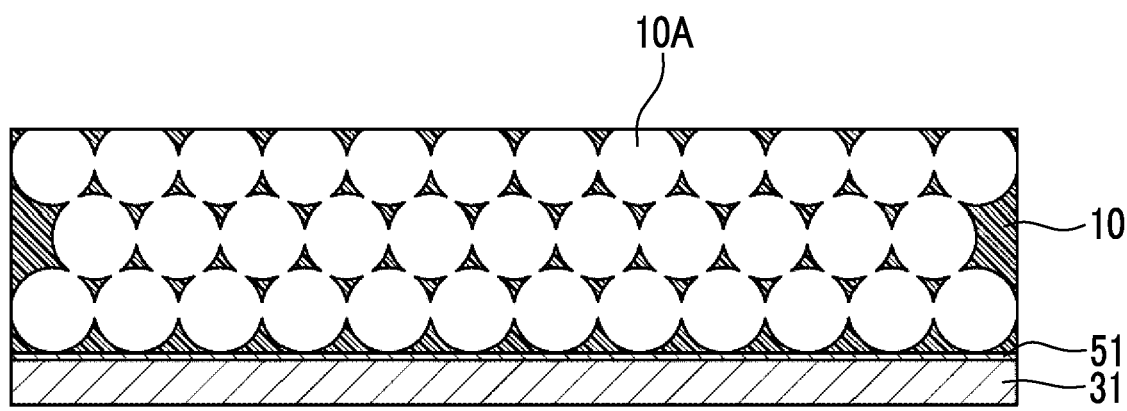

PARTICLE-DISPERSED POLYIMIDE PRECURSOR SOLUTION, METHOD FOR PRODUCING POROUS POLYIMIDE FILM, AND POROUS POLYIMIDE FILM

CROSS-REFERENCE TO RELATED APPLICATIONS

This application is based on and claims priority under 35 USC 119 from Japanese Patent Application No. 2020-176681 filed Oct. 21, 2020.

BACKGROUND

(i) Technical Field

The present invention relates to a particle-dispersed polyimide precursor solution, a method for producing a porous polyimide film, and a porous polyimide film.

(ii) Related Art

JP2006-104383A discloses a polyimide film obtained by a casting film forming method having at least a step of applying and drying a solution of polyamic acid as a polyimide precursor on a support, wherein a total content of Fe, Ni, and Cr in the film is 20 ppm or less.

JP2005-194318A discloses a polyimide film obtained by polycondensing an aromatic diamine and an aromatic tetracarboxylic anhydride, wherein a difference between a surface plane orientation degree of one surface of the polyimide film and a surface plane orientation degree of the other surface of the polyimide film is 2 or less.

SUMMARY

A porous polyimide film is obtained by using, for example, a particle-dispersed polyimide precursor solution containing a polyimide precursor, particles, and a solvent. Specifically, for example, the porous polyimide film is obtained by applying a particle-dispersed polyimide precursor solution onto a substrate to form a coating film, drying the coating film to form a film, heating the film to imidize the polyimide precursor, and removing the particles in the film.

However, in the particle-dispersed polyimide precursor solution, the dispersibility of the particles may change over time, causing aggregation of the particles and the like. Then, in a case where a porous polyimide film is produced using a particle-dispersed polyimide precursor solution in which aggregation of the particles is suppressed, a porous polyimide film in which uneven distribution of pores is suppressed is easily obtained.

Aspects of non-limiting embodiments of the present disclosure relates to a particle-dispersed polyimide precursor solution, a method for producing a porous polyimide film, and a porous polyimide film that provide a particle-dispersed polyimide precursor solution excellent in dispersion stability of particles in the particle-dispersed polyimide precursor solution as compared with the case of containing a polyimide precursor containing a unit in which B in the formula (I) is a p-phenylene group, particles, and a solvent.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The following inventions are provided in order to achieve the above object.

According to an aspect of the present disclosure, there is provided a particle-dispersed polyimide precursor solution containing a polyimide precursor having a unit represented by the following formula (I), particles, and a solvent, in which the particle-dispersed polyimide precursor solution satisfies both the following conditions (1) and (2),

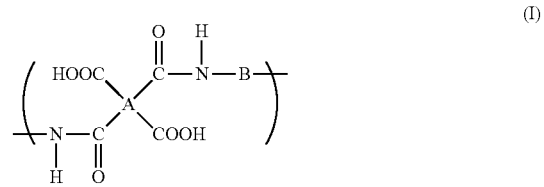

(in the formula (I), A represents a tetravalent organic group, and B represents a divalent organic group represented by any of the following formulas (B1) to (B4)),

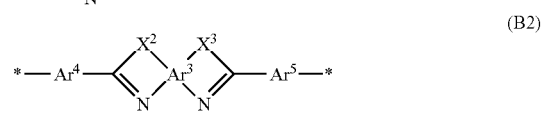

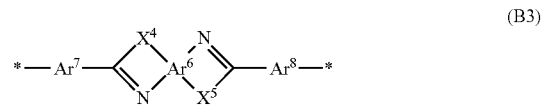

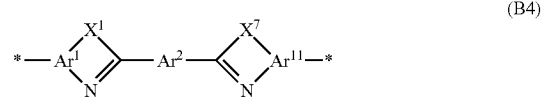

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and $Ar^8$ each independently represent a divalent aromatic group which may have a substituent, $Ar^3$ and $Ar^6$ each independently represent a tetravalent aromatic group which may have a substituent or a group represented by the following formula (II), $Ar^9$ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, S(=O)$_2$, or CRbRc, Rb and Rc each independently represent a hydrogen atom, an alkyl group which may have a substituent, or an aryl group, and * represents a bonding site with an adjacent linking group), Condition (1): a total content of the groups represented by the formulas (B1) to (B4) is 1% by mass or more and 40% by mass or less with respect to a total amount of the polyimide precursor; and Condition (2): a content of the particles is 5% by mass or more and 90% by mass or less with respect to a total content of the polyimide precursor and the particles.

BRIEF DESCRIPTION OF THE DRAWINGS

Exemplary embodiment(s) of the present invention will be described in detail based on the following FIGURES, wherein:

FIG. 1 is a schematic view showing a form of a porous polyimide film obtained by using a particle-dispersed polyimide precursor solution of the present exemplary embodiment.

DETAILED DESCRIPTION

Hereinafter, exemplary embodiments that are an example of the present invention will be described in detail.

Particle-Dispersed Polyimide Precursor Solution

First Aspect

The particle-dispersed polyimide precursor solution according to the first aspect contains a polyimide precursor having a unit represented by the following formula (I), particles, and a solvent, and satisfies both the following conditions (1) and (2):

Condition (1): a total content of the groups represented by the formulas (B1) to (B4) is 1% by mass or more and 40% by mass or less with respect to a total amount of the polyimide precursor; and Condition (2): a content of the particles is 5% by mass or more and 90% by mass or less with respect to a total content of the polyimide precursor and the particles,

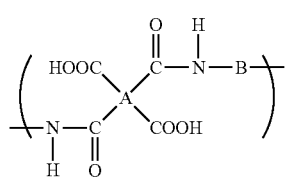
(I)

(in the formula (I), A represents a tetravalent organic group, and B represents a divalent organic group represented by any of the following formulas (B1) to (B4)),

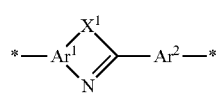
(B1)

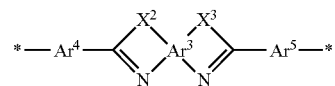
(B2)

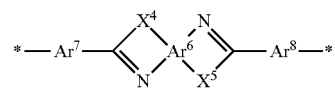
(B3)

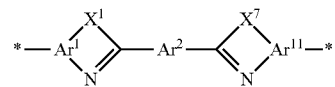
(B4)

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and $Ar^8$ each independently represent a divalent aromatic group which may have a substituent, $Ar^3$ and $Ar^6$ each independently represent a tetravalent aromatic group which may have a substituent or a group represented by the following formula (II), $Ar^9$ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

(II)

(III)

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, S(=O)$_2$, or CRbRc, Rb and Rc each independently represent a hydrogen atom, an alkyl group which may have a substituent, or an aryl group, and * represents a bonding site with an adjacent linking group).

Hereinafter, the organic group represented by the formula (B1), the organic group represented by the formula (B2), the organic group represented by the formula (B3), and the organic group represented by the formula (B4) are also referred to as an organic group B1, an organic group B2, an organic group B3, and an organic group B4, respectively.

Generally, in the particle-dispersed polyimide precursor solution, the dispersibility of the particles may change over time, causing aggregation of the particles and the like. Then, in a case where a porous polyimide film is produced using a particle-dispersed polyimide precursor solution in which aggregation of the particles is suppressed, a porous polyimide film in which uneven distribution of pores is suppressed is easily obtained.

Incidentally, the particle-dispersed polyimide precursor solution according to the first aspect is excellent in dispersion stability of particles in the particle-dispersed polyimide precursor solution as compared with the case of containing a polyimide precursor containing a unit in which B in the formula (I) is a p-phenylene group, particles, and a solvent. The reason is unclear, but it is presumed as follows.

The polyimide precursor contained in the particle-dispersed polyimide precursor solution according to the first aspect has a unit represented by the formula (I) and in which B in the formula (I) is any one of the organic groups B1 to B4. The organic groups B1 to B4 have a structure in which an aromatic ring containing no heteroatom and a heterocyclic ring are condensed, have a structure which has high planarity, is compact, has a balanced hydrophilic property and hydrophobic property, and has high affinity with the surfaces of the particles. Therefore, it is presumed that in a case where the polyimide precursor has any one of the organic groups B1 to B4, the organic groups B1 to B4 having high affinity with the surfaces of the particles contribute to maintaining the dispersion state of the particles, and the dispersion stability of the particles in the particle-dispersed polyimide precursor solution is excellent. It is further presumed that in the process of producing a porous polyimide film using the particle-dispersed polyimide precursor solution having excellent dispersion stability of particles, aggregation of particles is suppressed in a case where a film is formed by drying a coating film, and a porous polyimide film in which uneven distribution of pores is suppressed is easily obtained.

Further, the particle-dispersed polyimide precursor solution according to the first aspect is excellent in dispersion stability of particles in the particle-dispersed polyimide precursor solution as compared with the case where the total content of the organic groups B1 to B4 is less than 1% by mass with respect to the total amount of the polyimide precursor. The reason is unclear, but it is presumed that the high content of the organic groups B1 to B4 increases the contribution of the organic groups B1 to B4 to maintaining the dispersion state of the particles.

Furthermore, the particle-dispersed polyimide precursor solution according to the first aspect is excellent in dispersion stability of particles in the particle-dispersed polyimide precursor solution as compared with the case where the total content of the organic groups B1 to B4 exceeds 40% by mass with respect to the total amount of the polyimide precursor. The reason is unclear, but it is presumed as follows. That is, in a case where the content of the organic groups B1 to B4 exceeds 40% by mass, the packing between the molecular chains of the polyimide precursor becomes excessive in the solution, the effect of stabilizing the particle dispersion described above becomes small, and the aggregation of the polyimide precursor may easily occur over time in the solution. On the other hand, in a case where the total content of the organic groups B1 to B4 is 40% by mass or less with respect to the total amount of the polyimide precursor, aggregation of the polyimide precursor over time due to the excessive packing is suppressed. As a result, it is presumed that the contribution of the organic groups B1 to B4 to maintaining the dispersion state of the particles is further enhanced.

Second Aspect

The particle-dispersed polyimide precursor solution according to the second aspect contains a polyimide precursor having a unit represented by the formula (I), particles, and a solvent, and satisfies both the following conditions (3) and (4):

Condition (3): a total content of the groups represented by the formulas (B1) to (B4) is 1 part by mass or more and 50 parts by mass or less with respect to 100 parts by mass of the particles; and Condition (4): a content of the particles is 5% by mass or more and 90% by mass or less with respect to a total content of the polyimide precursor and the particles.

As described above, generally, in the particle-dispersed polyimide precursor solution, the dispersibility of the particles may change over time, causing aggregation of the particles and the like. Then, in a case where a porous polyimide film is produced using a particle-dispersed polyimide precursor solution in which aggregation of the particles is suppressed, a porous polyimide film in which uneven distribution of pores is suppressed is easily obtained.

Incidentally, the particle-dispersed polyimide precursor solution according to the second aspect is excellent in dispersion stability of particles in the particle-dispersed polyimide precursor solution as compared with the case of containing a polyimide precursor containing a unit in which B in the formula (I) is a p-phenylene group, particles, and a solvent. The reason is unclear, but it is presumed as follows.

The polyimide precursor contained in the particle-dispersed polyimide precursor solution according to the second aspect has a unit represented by the formula (I) and in which B in the formula (I) is any one of the organic groups B1 to B4. As described above, the organic groups B1 to B4 have a structure in which an aromatic ring containing no heteroatom and a heterocyclic ring are condensed, have a structure which has high planarity, is compact, has a balanced hydrophilic property and hydrophobic property, and has high affinity with the surfaces of the particles. Therefore, it is presumed that in a case where the polyimide precursor has any one of the organic groups B1 to B4, the organic groups B1 to B4 having high affinity with the surfaces of the particles contribute to maintaining the dispersion state of the particles, and the dispersion stability of the particles in the particle-dispersed polyimide precursor solution is excellent. It is further presumed that in the process of producing a porous polyimide film using the particle-dispersed polyimide precursor solution having excellent dispersion stability of particles, aggregation of particles is suppressed in a case where a film is formed by drying a coating film, and a porous polyimide film in which uneven distribution of pores is suppressed is easily obtained.

Further, the particle-dispersed polyimide precursor solution according to the second aspect is excellent in dispersion stability of particles in the particle-dispersed polyimide precursor solution as compared with the case where the total content of the organic groups B1 to B4 is less than 1 part by mass with respect to 100 parts by mass of the particles. The reason is unclear, but it is presumed that the high content of the organic groups B1 to B4 increases the contribution of the organic groups B1 to B4 to maintaining the dispersion state of the particles.

Furthermore, the particle-dispersed polyimide precursor solution according to the first aspect is excellent in dispersion stability of particles in the particle-dispersed polyimide precursor solution as compared with the case where the total content of the organic groups B1 to B4 exceeds 50 parts by mass with respect to 100 parts by mass of the particles. The reason is unclear, but it is presumed as follows. That is, in a case where the content of the organic groups B1 to B4 exceeds 50 parts by mass, the packing between the molecular chains of the polyimide precursor becomes excessive in the solution, the effect of stabilizing the particle dispersion described above becomes small, and the aggregation of the polyimide precursor may easily occur over time in the solution. On the other hand, in a case where the total content of the organic groups B1 to B4 is 50 parts by mass or less with respect to 100 parts by mass of the particles, aggregation of the polyimide precursor over time due to the excessive packing is suppressed. As a result, it is presumed that the contribution of the organic groups B1 to B4 to maintaining the dispersion state of the particles is further enhanced.

Hereinafter, the particle-dispersed polyimide precursor solution corresponding to both the particle-dispersed polyimide precursor solution according to the first aspect and the particle-dispersed polyimide precursor solution according to the second aspect will be referred to as "particle-dispersed polyimide precursor solution according to the present exemplary embodiment". However, an example of the particle-dispersed polyimide precursor solution of the exemplary embodiments of the present invention may be any particle-dispersed polyimide precursor solution corresponding to at least one of the particle-dispersed polyimide precursor solution according to the first aspect or the particle-dispersed polyimide precursor solution according to the second aspect.

Polyimide Precursor

The particle-dispersed polyimide precursor solution of the present exemplary embodiment contains a polyimide precursor having a unit represented by the following formula (I).

Hereinafter, the unit represented by the following formula (1) is also referred to as a "specific unit", and the polyimide precursor having a specific unit is also referred to as a "specific precursor".

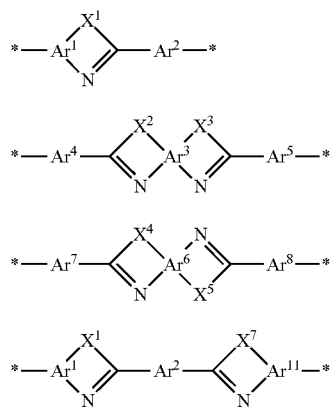

In the formula (I),
A represents a tetravalent organic group, and
B represents a divalent organic group represented by any of the following formulas (B1) to (B4) (that is, any of the organic groups B1 to B4).

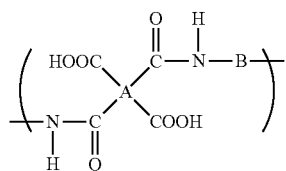

In the formulas (B1) to (B4),
Ar$^1$, Ar$^{10}$, and Ar$^{11}$ each independently represent a trivalent aromatic group which may have a substituent,
Ar$^2$, Ar$^4$, Ar$^5$, Ar$^7$ and Ar$^8$ each independently represent a divalent aromatic group which may have a substituent,
Ar$^3$ and Ar$^6$ each independently represent a tetravalent aromatic group which may have a substituent or a group represented by the following formula (II),
Ar$^9$ represents a divalent aromatic group which may have a substituent or a group represented by the following formula (III),
X$^1$ to X$^7$ each independently represent NRa, O, or S, Ra represents a hydrogen atom, an alkyl group which may have a substituent, or an aryl group, and
* represents a bonding site with an adjacent linking group.

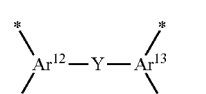

In the formulas (II) and (III),
Ar$^{12}$ and Ar$^{13}$ each independently represent a trivalent aromatic group which may have a substituent,
Ar$^{14}$ and Ar$^{15}$ each independently represent a divalent aromatic group which may have a substituent,
Y and Z each independently represent O, S, S(=O)$_2$, or CRbRc, Rb and Rc each independently represent a hydrogen atom, an alkyl group which may have a substituent, or an aryl group, and
* represents a bonding site with an adjacent linking group.

Specific Unit

Here, in the general formula (I), examples of the tetravalent organic group represented by A include a residue obtained by removing four carboxyl groups from the tetracarboxylic dianhydride used as a raw material.

On the other hand, examples of the divalent organic group represented by B include a residue obtained by removing two amino groups from the diamine compound used as a raw material.

That is, the polyimide precursor having the unit represented by the general formula (I) is a polymer of a tetracarboxylic dianhydride and a diamine compound.

Examples of the tetracarboxylic dianhydride include both aromatic and aliphatic compounds thereof, and preferred are aromatic compounds thereof, for example. That is, in the general formula (I), the tetravalent organic group represented by A is, for example, preferably an aromatic organic group.

Examples of the aromatic tetracarboxylic dianhydride include pyromellitic anhydride, 3,3',4,4'-benzophenonetetracarboxylic dianhydride, 3,3',4,4'-diphenylsulfonetetracarboxylic dianhydride, 4,4'-oxydiphthalic anhydride, 3,4'-oxydiphthalic anhydride, 3,3',4,4'-biphenyltetracarboxylic dianhydride, 2,3,3',4'-biphenyltetracarboxylic dianhydride, 4,4'-(hexafluoroisopropylidene)diphthalic anhydride, 2,2-bis(3,4-dicarboxyphenyl)propane dianhydride, bis(3,4-dicarboxyphenyl)methane dianhydride, 1,4-bis(3,4-dicarboxyphenoxy)benzene dianhydride, 1,4-bis(2,3-dicarboxyphenoxy)benzene dianhydride, p-phenylenebis(trimellitate anhydride), m-phenylenebis(trimellitate anhydride), 2,2-bis[4-(3,4-dicarboxyphenoxy)phenyl]propane dianhydride, naphthalene-1,4,5,8-tetracarboxylic dianhydride, naphthalene-2,3,6,7-tetracarboxylic dianhydride, 9,9-bis(3,4-dicarboxyphenyl)fluorene dianhydride, 4,4'-diphenyletherbis(trimellitate anhydride), 4,4'-diphenylmethanebis(trimellitate anhydride), 4,4'-bis(3,4-dicarboxyphenoxy)diphenylsulfide dianhydride, 4,4'-bis(3,4- dicarboxyphenoxy)diphenylsulfone dianhydride, 4,4'-bis(3, 4-dicarboxyphenoxy)diphenylether dianhydride, 2,2-bis(4-hydroxyphenyl)propanbis(trimellitate anhydride), p-terphenyltetracarboxylic dianhydride, m-terphenyltetracarboxylic dianhydride, and the like.

Examples of the aliphatic tetracarboxylic dianhydride include aliphatic or alicyclic tetracarboxylic dianhydride such as butane tetracarboxylic dianhydride, 1,2,3,4-cyclobutane tetracarboxylic dianhydride, 1,3-dimethyl-1,2,3,4-cyclobutane tetracarboxylic dianhydride, 1,2,3,4-cyclopentane tetracarboxylic dianhydride, 2,3,5-tricarboxycyclopentyl acetic dianhydride, 3,5,6-tricarboxynorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione; and the like.

Among these, the tetracarboxylic dianhydride may be preferably, for example, an aromatic tetracarboxylic dianhydride, and specifically, for example, pyromellitic anhydride, 3,3',4,4'-benzophenonetetracarboxylic dianhydride, 4,4'-oxydiphthalic anhydride, 3,3',4,4'-biphenyltetracarboxylic dianhydride, and may be 2,3,3',4'-biphenyltetracarboxylic dianhydride, and further, may be pyromellitic anhydride, 3,3',4,4'-biphenyltetracarboxylic dianhydride, and 3,3',4,4'-benzophenonetetracarboxylic dianhydride, and in particular, may be 3,3',4,4'-biphenyltetracarboxylic dianhydride.

The tetracarboxylic dianhydride may be used alone or in combination of two or more kinds thereof.

In addition, in a case of the combination use of two or more kinds thereof, the aromatic tetracarboxylic dianhydride or the aliphatic tetracarboxylic acid may each be used in combination, or the aromatic tetracarboxylic dianhydride and the aliphatic tetracarboxylic dianhydride may be combined to be used.

On the other hand, the diamine compound is a diamine compound having two amino groups in the molecular structure.

In the polymerization of the specific precursor, a diamine having any one of the organic groups B1 to B4, that is, a diamine in which * at both ends of any one of the organic groups B1 to B4 are substituted with —NH$_2$ is used as the diamine compound. Hereinafter, the diamine having any of the organic groups B1 to B4 is also referred to as a "specific diamine compound".

The formulas (B1) to (B4) will be described.

$Ar^1$, $Ar^{10}$, and $Ar^{11}$ in the formulas (B1) and (B4) each independently represent a trivalent aromatic group which may have a substituent.

Examples of the trivalent aromatic group represented by $Ar^1$, $Ar^{10}$, and $Ar^{11}$ in the formulas (B1) and (B4) include a trivalent aromatic hydrocarbon group having at least an aromatic ring and having 20 or less carbon atoms.

Specific examples of the aromatic ring included in the trivalent aromatic group include a monocyclic aromatic ring such as benzene, an aromatic ring to which a monocyclic aromatic ring such as biphenyl or terphenyl is bonded, and an aromatic ring to which a monocyclic aromatic ring such as naphthalene, anthracene or phenanthrene is condensed. Among these, the aromatic ring of the trivalent aromatic group is preferably, for example, benzene, naphthalene, or biphenyl, and more preferably benzene.

Examples of the substituent (other than hydrogen atom) which the trivalent aromatic group may have include an alkyl group, an aryl group, an aralkyl group, an alkoxy group, and a halogen atom (fluorine atom, chlorine atom, bromine atom, iodine atom).

Examples of the alkyl group as the substituent include an alkyl group having 1 or more and 10 or less carbon atoms. Examples of the aryl group as the substituent include a phenyl group. Examples of the aralkyl group as the substituent include a benzyl group. Examples of the alkoxy group as the substituent include an alkoxy group having 1 or more and 8 or less carbon atoms.

The trivalent aromatic group preferably, for example, has no substituent or an alkyl group as a substituent, more preferably has no substituent or a methyl group as a substituent, and still more preferably has no substituent.

The trivalent aromatic group is preferably, for example, a group in which three atoms among carbon atoms constituting an aromatic ring are bonded to adjacent atoms (for example, $X^1$ in the formula (B1)) shown in the formulas (B1) and (B4).

$Ar^2$, $Ar^4$, $Ar^5$, $Ar^7$ and $Ar^8$ in the formulas (B1) to (B3) each independently represent a divalent aromatic group which may have a substituent.

Examples of the divalent aromatic group represented by $Ar^2$, $Ar^4$, $Ar^5$, $Ar^7$ and $Ar^8$ in the formulas (B1) to (B3) include a divalent aromatic hydrocarbon having at least an aromatic ring and having 20 or less carbon atoms.

Specific examples of the aromatic ring which the divalent aromatic group has and the substituent which the divalent aromatic group may have are the same as specific examples of the aromatic ring which the trivalent aromatic group has and the substituent which the trivalent aromatic group may have.

The aromatic ring of the divalent aromatic group is preferably, for example, benzene or biphenyl, and more preferably benzene.

The divalent aromatic group preferably, for example, has no substituent or an alkyl group as a substituent, more preferably has no substituent or a methyl group as a substituent, and still more preferably has no substituent.

The divalent aromatic group is preferably, for example, a group in which two atoms among carbon atoms constituting an aromatic ring are bonded to adjacent atoms (for example, carbon atom adjacent to $A^2$ in the formula (B1)) shown in the formulas (B1) to (B3).

$Ar^3$ and $Ar^6$ in the formulas (B2) and (B3) each independently represent a tetravalent aromatic group which may have a substituent or a group represented by the formula (II).

Examples of the tetravalent aromatic group represented by $Ar^3$ or $Ar^6$ in the formulas (B2) and (B3) include a tetravalent aromatic hydrocarbon having at least an aromatic ring and having 20 or less carbon atoms.

Specific examples of the aromatic ring which the tetravalent aromatic group has and the substituent which the tetravalent aromatic group may have are the same as specific examples of the aromatic ring which the trivalent aromatic group has and the substituent which the trivalent aromatic group may have.

The aromatic ring of the tetravalent aromatic group is preferably, for example, benzene or biphenyl, and more preferably benzene.

The tetravalent aromatic group preferably, for example, has no substituent or an alkyl group as a substituent, more preferably has no substituent or a methyl group as a substituent, and still more preferably has no substituent.

The tetravalent aromatic group is preferably, for example, a group in which four atoms among carbon atoms constituting an aromatic ring are bonded to adjacent atoms (for example, $X^2$ in the formula (B2)) shown in the formulas (B2) and (B3).

$Ar^{12}$ and $Ar^{13}$ in the formula (II) each independently represent a trivalent aromatic group which may have a substituent. Examples of the trivalent aromatic group represented by $Ar^{11}$ or $Ar^{13}$ in the formula (II) are the same as the trivalent aromatic group represented by $Ar^1$, $Ar^{10}$, or $Ar^{11}$ in the formulas (B1) and (B4), and the preferred form is also the same.

Y in the formula (II) represents O, S, S(=O)$_2$, or CRbRc.

Rb and Rc each independently represent a hydrogen atom, an alkyl group which may have a substituent, or an aryl group. Examples of the alkyl group represented by Rb or Rc include an alkyl group having 3 or less carbon atoms, and examples of the substituent which the alkyl group represented by Rb or Rc may have include a fluorine atom. Examples of the alkyl group represented by Rb or Rc include preferably an alkyl group having no substituent and an alkyl group having a fluorine atom as a substituent, more preferably an alkyl group having no substituent and a trifluoroalkyl group, and still more preferably a methyl group and a trifluoromethyl group. Examples of the aryl group represented by Rb or Rc include a phenyl group. Rb and Rc are each independently, for example, preferably a hydrogen atom, an alkyl group, a trifluoroalkyl group, or a phenyl group, and more preferably a methyl group or a trifluoromethyl group.

Most preferably, Y in the formula (II) is, for example, O, S(=O)$_2$, C(CH$_3$)$_2$, or C(CF$_3$)$_2$.

Examples of the groups represented by $Ar^3$ and $Ar^6$ in the formulas (B2) and (B3) include preferably the following formulas (Ar-31) to (Ar-35). In the following formula, * represents a bonding site with an adjacent linking group.

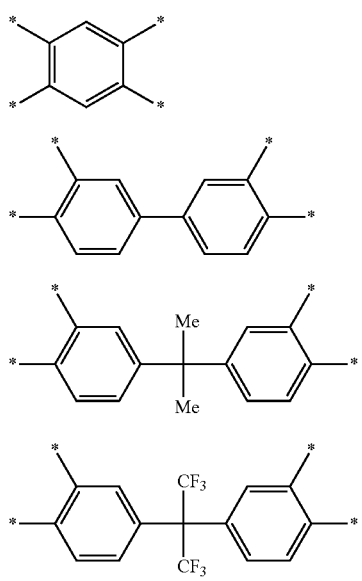

Formula (Ar-31)

Formula (Ar-32)

Formula (Ar-33)

Formula (Ar-34)

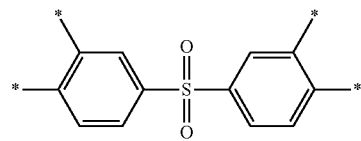

Formula (Ar-35)

$Ar^9$ in the formula (B4) represents a divalent aromatic group which may have a substituent or a group represented by the formula (III).

Examples of the divalent aromatic group represented by $Ar^9$ in the formula (B4) are the same as the divalent aromatic group represented by $Ar^2$, $Ar^4$, $Ar^5$, $Ar^7$ and $Ar^8$ in the formulas (B1) to (B3), and the preferred form is also the same.

$Ar^{14}$ and $Ar^{15}$ in the formula (III) each independently represent a divalent aromatic group which may have a substituent. Examples of the divalent aromatic group represented by $Ar^{14}$ and $Ar^{15}$ in the formula (III) are the same as the divalent aromatic group represented by $Ar^2$, $Ar^4$, $Ar^5$, $Ar^7$ and $Ar^8$ in the formulas (B1) to (B3), and the preferred form is also the same.

Examples of Z in the formula (III) include the same groups as Y in the formula (II), and the preferred form is also the same.

Examples of the groups represented by $Ar^9$ in the formula (B4) include preferably the following formulas (Ar-91) to (Ar-95). In the following formula, * represents a bonding site with an adjacent linking group.

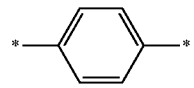

Formula (Ar-91)

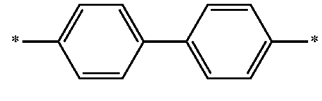

Formula (Ar-92)

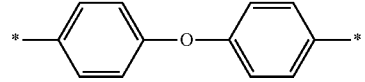

Formula (Ar-93)

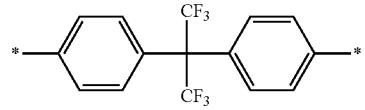

Formula (Ar-94)

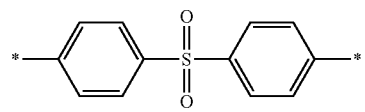

Formula (Ar-95)

$X^1$ to $X^7$ in the formulas (B1) to (B4) each independently represent NRa, O, or S.

Ra represents a hydrogen atom, an alkyl group which may have a substituent, or an aryl group. Examples of the alkyl group represented by Ra include an alkyl group having 3 or less carbon atoms, and examples of the substituent which the alkyl group represented by Ra may have include a fluorine atom. Examples of the alkyl group represented by Ra include preferably an alkyl group having no substituent, more preferably an alkyl group having 3 or less carbon atoms having no substituent, and still more preferably a methyl group. Examples of the aryl group represented by Ra include a phenyl group. Ra is preferably, for example, a hydrogen atom, an alkyl group having 3 or less carbon atoms having no substituent, or a phenyl group, and more preferably a hydrogen atom or an alkyl group having 3 or less carbon atoms having no substituent.

$X^1$ to $X^7$ in the formulas (B1) to (B4) are, for example, preferably O, S, NH, NMe, NEt, or NPh, more preferably O or S, and still more preferably O. Me represents a methyl group, Et represents an ethyl group, and Ph represents a phenyl group.

The organic groups B1 to B4 are preferably, for example, groups represented by the following formulas (B1a) to (B4a) (hereinafter, also referred to as "organic groups B1a to B4a"), respectively.

In a case where the organic groups B1 to B4 are the organic groups B1a to B4a, the particle-dispersed polyimide precursor solution is excellent in the dispersion stability of the particles as compared with the case where the organic groups B1 to B4 are groups represented by (B4-7) described later. The reason is unclear, but it is presumed as follows.

For example, as in the group represented by (B4-7), in a case where "a structure in which an aromatic ring containing no heteroatom and a heterocyclic ring are condensed (hereinafter, also referred to as" specific condensed heterocyclic ring ")" which is an essential structure in the organic groups B1 to B4 is linked via two or more aromatic rings, the balance between hydrophilicity and hydrophobicity may be lost. In a case where the balance between hydrophilicity and hydrophobicity is lost, the packing property between the molecular chains of the polyimide precursor tends to be higher than the affinity between the specific condensed aromatic ring in the polyimide precursor and the particle surface. On the other hand, it is presumed that in a case where the organic groups B1 to B4 are the organic groups B1a to B4a, the balance between hydrophilicity and hydrophobicity becomes good, and the affinity between the specific condensed aromatic ring in the polyimide precursor and the particle surface becomes high, so that the dispersion stability of the particles is excellent.

Formula (B1a)
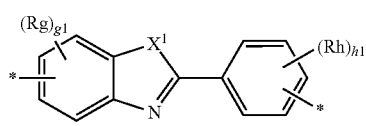

Formula (B2a)
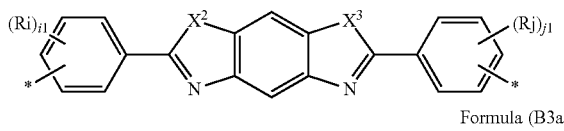

Formula (B3a)
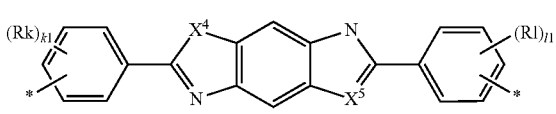

Formula (B4a)
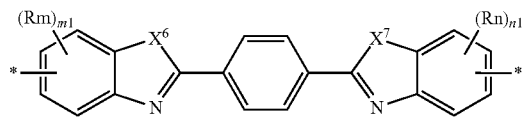

In the formulas (B1a) to (B4a),

Rg, Rh, Ri, Rj, Rk, Rl, Rm, and Rn each independently represent an alkyl group, an alkoxy group, a halogen atom or an aryl group, g1, m1, and n1 each independently represent an integer of 0 to 3, h1, i1, j1, k1, and l1 each independently represent an integer of 0 to 4, $X^1$ to $X^7$ each independently represent NRa, O, or S, Ra represents a hydrogen atom, an alkyl group which may have a substituent, or an aryl group, and

* represents a bonding site with an adjacent linking group.

Rg, Rh, Ri, Rj, Rk, Rl, Rm, and Rn in the formulas (B1a) to (B4a) each independently represent an alkyl group, an alkoxy group, a halogen atom or an aryl group.

Examples of the alkyl group and alkoxy group represented by Rg, Rh, Ri, Rj, Rk, Rl, Rm, or Rn in the formulas (B1a) to (B4a) include an alkyl group having 1 or more and 6 or less carbon atoms, and an alkoxy group having 1 or more and 4 or less carbon atoms.

Examples of the halogen atom represented by Rg, Rh, Ri, Rj, Rk, Rl, Rm, or Rn in the formulas (B1a) to (B4a) include a fluorine atom, a chlorine atom, a bromine atom, and an iodine atom.

Examples of the aryl group represented by Rg, Rh, Ri, Rj, Rk, Rl, Rm, or Rn in the formulas (B1a) to (B4a) include a phenyl group.

Rg, Rh, Ri, Rj, Rk, Rl, Rm, and Rn in the formulas (B1a) to (B4a) are each independently, for example, preferably an alkyl group having 3 or less carbon atoms or an alkoxy group, a fluorine atom or a chlorine atom, more preferably an alkyl group having 3 or less carbon atoms, and still more preferably a methyl group.

g1, m1, and n1 in the formulas (B1a) to (B4a) each independently represent, for example, an integer of 0 to 3, preferably represent an integer of 0 to 1, and more preferably 0.

h1, i1, j1, k1, and l1 in the formulas (B1a) to (B4a) each independently represent, for example, an integer of 0 to 4, preferably represent an integer of 0 to 1, and more preferably 0.

$X^1$ to $X^7$ in the formulas (B1a) to (B4a) have the same meanings as $X^1$ to $X^7$ in the formulas (B1) to (B4).

Specific examples of the organic groups B1 to B4 will be shown below, but the organic groups B1 to B4 are not limited thereto.

| Formula | Structure |
|---|---|
| (B1-1) | 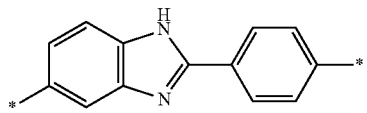 [SMILES: *c1ccc(-c2nc3cc(*)ccc3[nH]2)cc1] |

-continued

| Formula | Structure |
|---|---|
| (B1-2) | 1-methyl-2-(4-*)phenyl-1H-benzimidazole, 6-* |
| (B1-3) | 1-phenyl-2-(4-*)phenyl-1H-benzimidazole, 6-* |
| (B1-4) | 2-(4-*)phenyl-1H-benzimidazole, 6-* |
| (B1-5) | 2-(3-*)phenyl-1H-benzimidazole, 5-* |
| (B1-6) | 2-(4-*)phenyl-benzoxazole, 5-* |
| (B1-7) | 2-(4-*)phenyl-benzoxazole, 6-* |
| (B1-8) | 2-(3-*)phenyl-benzoxazole, 6-* |
| (B1-9) | 2-(3-*)phenyl-benzoxazole, 5-* |
| (B1-10) | 2-(4-*)phenyl-naphth[1,2-d]oxazole, 5-* |
| (B1-11) | 2-(4-*)phenyl-naphth[2,1-d]oxazole, 7-* |
| (B1-12) | 2-(4-*)phenyl-benzothiazole, 6-* |

-continued

| Formula | Structure |
|---|---|
| (B1-13) | |
| (B1-14) | |
| (B1-15) | |
| (B1-16) | |
| (B1-17) | |
| (B2-1) | |
| (B2-2) | |
| (B2-3) | |
| (B2-4) | |
| (B2-5) | |
| (B2-6) | |

-continued

| Formula | Structure |
|---|---|
| (B2-7) | 1,5-diphenyl-2,6-bis(4-*-phenyl)-benzimidazo[4,5-f]benzimidazole |
| (B2-8) | 1,5-dimethyl-2,6-bis(3-*-phenyl)-benzimidazo[4,5-f]benzimidazole |
| (B2-9) | 2,2'-bis(4-*-phenyl)-6,6'-bibenzoxazole |
| (B2-10) | 2,2'-bis(3-*-phenyl)-6,6'-bibenzoxazole |
| (B2-11) | 2,2-bis[2-(4-*-phenyl)benzoxazol-5-yl]propane |
| (B2-12) | 2,2-bis[2-(3-*-phenyl)benzoxazol-5-yl]propane |
| (B2-13) | 2,2-bis[2-(4-*-phenyl)benzoxazol-5-yl]propane (isomer) |
| (B2-14) | hexafluoro-2,2-bis[2-(3-*-phenyl)benzoxazol-5-yl]propane |

-continued

| Formula | Structure |
|---|---|
| (B2-15) | |
| (B2-16) | |
| (B3-1) | |
| (B3-2) | |
| (B3-3) | |
| (B3-4) | |
| (B3-5) | |
| (B3-6) | |
| (B4-1) | |
| (B4-2) | |
| (B4-3) | |

-continued

| Formula | Structure |
|---------|-----------|
| (B4-4) | |
| (B4-5) | |
| (B4-6) | |
| (B4-7) | |
| (B4-8) | |
| (B4-9) | |
| (B4-10) | |
| (B4-11) | |
| (B4-12) | |
| (B4-13) | |
| (B4-14) | |
| (B4-15) | |
| (B4-16) | |

| Formula | Structure |
|---|---|
| (B4-17) | [chemical structure: benzoxazole–phenyl–SO₂–phenyl–benzoxazole, with attachment points at 5-positions] |
| (B4-18) | [chemical structure: benzoxazole–phenyl–SO₂–phenyl–benzoxazole, with attachment points at 6-positions] |

The specific precursor may contain only one kind of the specific unit or may contain two or more kinds thereof. The specific precursor may be in a form including two or more kinds of the specific unit including any of the organic groups B1 to B4 (for example, a form including a specific unit including a group represented by the formula (B1-1) and a specific unit including a group represented by the formula (B1-2)). Further, the specific precursor may be in a form including a specific unit including any of the organic groups B1 to B4 and a specific unit including any other of the organic groups B1 to B4 (for example, a form including a specific unit including the organic group B1 and a specific unit including the organic group B2).

The specific precursor contains at least a specific unit, and may optionally contain a unit other than the specific unit (hereinafter, also referred to as "another unit").

That is, the specific precursor may be a copolymer of a tetracarboxylic dianhydride, a diamine compound containing any of the organic groups B1 to B4 (that is, a specific diamine compound), and a diamine compound not containing any of the organic groups B1 to B4 (that is, another diamine compound).

In a case where the specific precursor contains the specific unit and the other unit, the ratio of the specific unit in the specific precursor is adjusted such that the total content of the organic groups B1 to B4 is within the target range.

Content of Organic Groups B1 to B4

In the first aspect, the total content of the organic groups B1 to B4 is 1% by mass or more and 40% by mass or less with respect to the total amount of the polyimide precursor.

Further, also in the second aspect, the total content of the organic groups B1 to B4 is preferably, for example, 1% by mass or more and 40% by mass or less with respect to the total amount of the polyimide precursor.

From the viewpoint of particle dispersion stability in the particle-dispersed polyimide precursor solution, the total content of the organic groups B1 to B4 is more preferably, for example, 3% by mass or more and 30% by mass or less, and still more preferably 5% by mass or more and 25% by mass or less, with respect to the total amount of the polyimide precursor.

In the second aspect, the total content of the organic groups B1 to B4 is 1 part by mass or more and 50 parts by mass or less with respect to 100 parts by mass of the particles described later.

Also in the first aspect, the total content of the organic groups B1 to B4 is preferably, for example, 1 part by mass or more and 50 parts by mass or less with respect to 100 parts by mass of the particles.

From the viewpoint of particle dispersion stability in the particle-dispersed polyimide precursor solution, the total content of the organic groups B1 to B4 is more preferably, for example, 5 parts by mass or more and 40 parts by mass or less, and still more preferably 7 parts by mass or more and 30 parts by mass or less, with respect to 100 parts by mass of the particles.

The total amount of the specific diamine compounds constituting the specific precursor is preferably, for example, 5 mol % or more and 90 mol % or less, more preferably 10 mol % or more and 80 mol % or less, and still more preferably 25 mol % or more and 70 mol % or less, with respect to the total amount of the diamine compounds constituting the specific precursor.

Examples of the method of analyzing the total content of the organic groups B1 to B4 contained in the polyimide precursor from the particle-dispersed polyimide precursor solution include the following methods.

First, the particles are separated from the particle-dispersed polyimide precursor solution to be measured. Next, methanol is added to the polyimide precursor solution from which the particles have been separated to obtain a reprecipitation of the polyimide precursor. The reprecipitation is placed in a pressure-resistant container, an aqueous solution of 1N sodium hydroxide is added thereto, and the mixture is treated at 100° C. for 2 hours to obtain a hydrolyzed product of the polyimide precursor. Next, the hydrolyzed product is extracted with chloroform and analyzed from the concentrated solution of the chloroform phase by infrared spectroscopy, nuclear magnetic resonance spectroscopy, and gas chromatography to measure the structure and amount of the component derived from diamine compound. Further, the aqueous phase, which is the chloroform-insoluble phase of the hydrolyzed product, is neutralized and freeze-dried to obtain a dried solid content. The dried solid content is then subjected to extraction with methanol, and the lysate therefrom is analyzed by infrared spectroscopy, nuclear magnetic resonance spectroscopy, and gas chromatography to measure the structure and amount of the component derived from tetracarboxylic dianhydride.

The total content of the organic groups B1 to B4 in the polyimide film is determined by analyzing by infrared spectroscopy, nuclear magnetic resonance spectroscopy, and gas chromatography on the polyimide film.

From the measurement result, the total content of the organic groups B1 to B4 with respect to the total amount of the polyimide precursor and the total content of the specific amine compound with respect to the total amount of the diamine compound constituting the specific precursor are calculated.

Further, the solid content of the particles contained in the particle-dispersed polyimide precursor solution is measured from the separated particles. Then, the total content of the organic groups B1 to B4 with respect to 100 parts by mass of the particles is calculated from the measurement result of the content of the particles and the measurement result of the total content of the organic groups B1 to B4.

Other Units

Examples of the other unit include a unit in which the tetracarboxylic dianhydride described above and a diamine compound not containing any of the organic groups B1 to B4 (hereinafter, also referred to as "another diamine compound") are bonded to each other. That is, examples of the other unit include a unit in which B in the general formula (I) is an organic group other than the formulas (B1) to (B4).

Examples of the other diamine compound include both aromatic and aliphatic compounds thereof, and preferred are aromatic compounds thereof, for example. That is, in the general formula (I), the divalent organic group represented by B is, for example, preferably an aromatic organic group.

Examples of the other diamine compound include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; and aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylenediamine, tricyclo[6,2,1,0$^{2.7}$]-undecylene dimethyldiamine, and 4,4'-methylenebis(cyclohexylamine).

Among these, the other diamine compound may be preferably, for example, an aromatic diamine compound, specifically, may be p-phenylenediamine, m-phenylenediamine, 4,4'-diaminodiphenylmethane, 4,4'-diaminodiphenylether, 3,4'-diaminodiphenylether, 4,4'-diaminodiphenylsulfide, and 4,4'-diaminodiphenylsulfone, and in particular, may be 4,4'-diaminodiphenyl ether, and p-phenylenediamine.

The other diamine compound may be used alone or in combination of two or more kinds thereof. In addition, in a case of the combination use of two or more kinds thereof, aromatic diamine compounds or aliphatic diamine compounds may each be used in combination, or aromatic diamine compounds and aliphatic diamine compounds may be combined to be used.

Molecular weight of specific precursor, and the like

The weight-average molecular weight of the specific precursor is, for example, preferably 5000 or more and 300,000 or less, and more preferably 10,000 or more and 150,000 or less.

The weight-average molecular weight of the polyimide precursor is measured by a gel permeation chromatography (GPC) method under the following measurement conditions.

Column: Tosoh TSK gel α-M (7.8 mm I.D×30 cm)

Eluent: dimethylformamide (DMF)/30 mM LiBr/60 mM phosphoric acid

Flow rate: 0.6 mL/min

Injection volume: 60 μL

Detector: differential refractive index detector (RI)

The particle-dispersed polyimide precursor solution according to the present exemplary embodiment contains at least a specific precursor, and may optionally contain a polyimide precursor other than the specific precursor (hereinafter, also referred to as "another precursor").

Examples of the other precursor include polyimide precursors not containing any of the organic groups B1 to B4.

In a case where the particle-dispersed polyimide precursor solution contains both the specific precursor and another precursor, the ratio of the specific precursor to the entire polyimide precursor is, for example, 80% by mass or more, preferably 90% by mass or more, and more preferably 95% by mass or more.

In a case where the particle-dispersed polyimide precursor solution contains another precursor, the "total amount of polyimide precursor" means the total amount of the specific precursor and the other precursor.

The content of the entire polyimide precursor contained in the particle-dispersed polyimide precursor solution according to the present exemplary embodiment is, for example, 0.1% by mass or more and 40% by mass or less, and preferably 1% by mass or more and 25% by mass or less with respect to the total mass of the particle-dispersed polyimide precursor solution.

Particles

The particle-dispersed polyimide precursor solution of the present exemplary embodiment contains particles.

The material of the particles is in a state of being dispersed without being dissolved in the particle-dispersed polyimide precursor solution, and is not particularly limited as long as the particles can be removed by the particle removing step described later in the case of producing the porous polyimide film. The particles are broadly classified into resin particles and inorganic particles, which will be described later.

As used herein, in the present specification, "the particles do not dissolve" includes the particles not dissolving in the target liquid at 25° C., as well as dissolving in the range of 3% by mass or less.

The volume-average particle size D50v of the particles is not particularly limited. The volume-average particle size D50v of the particles may be, for example, in the range of 0.1 μm or more and 30 μm or less, preferably 0.15 μm or more and 10 μm or less, more preferably 0.2 μm or more and 5 μm or less, and still more preferably 0.25 μm or more and 1 μm or less. In a case where the volume-average particle size of the particles is in this range, the aggregation property is easily suppressed. Further, in a case where the particles are resin particles, the productivity of the resin particles is easily improved.

The volume particle size distribution index (GSDv) of the particles is, for example, preferably 1.30 or less, more preferably 1.25 or less, and most preferably 1.20 or less. The volume particle size distribution index of the particles is calculated as $(D84v/D16v)^{1/2}$ from the particle size distribution of the particles in the particle-dispersed polyimide precursor solution.

The particle size distribution of the particles in the particle-dispersed polyimide precursor solution according to the present exemplary embodiment is measured as follows. The solution to be measured is diluted and the particle size distribution of the particles in the liquid is measured using Coulter counter LS13 (manufactured by Beckman Coulter, Inc.). Based on the measured particle size distribution, the volume cumulative distribution is drawn from the small diameter side with respect to the divided particle size range (channel) to measure the particle size distribution.

In the volume cumulative distribution drawn from the small diameter side, the particle size with a cumulative total 16% is defined as the volume particle size D16v, the particle size with a cumulative total 50% is defined as the volume-average particle size D50v, and the particle size with a cumulative total 84% is defined as the volume particle size D84v.

In a case where the volume particle size distribution of the particles in the particle-dispersed polyimide precursor solution of the present exemplary embodiment is difficult to measure by the above method, the particle size distribution is measured by a method such as a dynamic light scattering method.

The shape of the particles may be, for example, spherical. In a case where a porous polyimide film is prepared using the spherical particles, a porous polyimide film having spherical pores can be obtained.

In the present specification, the term "spherical" in the particle encompasses both spherical and substantially spherical (a shape close to a spherical shape) shapes. Specifically, the term "spherical" means that the ratio of particles having a major axis to minor axis ratio (major axis/minor axis) of 1 or more and 1.5 or less is 90% or more. The closer the major axis to minor axis ratio approaches 1, the more spherical the particles become.

As the particles, either resin particles or inorganic particles may be used, but for example, resin particles are preferably used.

By using the resin particles as the particles, the particles in the particle-dispersed polyimide precursor solution are excellent in the dispersion stability as compared with the case of using the inorganic particles. The reason is unclear, but it is presumed that in a case where the resin particles and the polyimide precursor are organic materials, the affinity between the organic groups B1 to B4 and the surfaces of the particles becomes high as compared with the case of using inorganic particles, and the dispersion stability of the particles in the particle-dispersed polyimide precursor solution is increased.

Further, as described later, the resin particles can be easily produced into particles close to a spherical shape by a known production method such as emulsion polymerization. Further, since the resin particles and the polyimide precursor are organic materials, the particle dispersibility in the coating film and the interfacial adhesion with the polyimide precursor are easily improved as compared with the case of using inorganic particles. Further, in a case where a porous polyimide film is prepared, a porous polyimide film having more uniform pores and pore diameters is easily obtained. For these reasons, for example, it is preferable to use resin particles.

Examples of the inorganic particles include silica particles. Silica particles are suitable inorganic particles in that, for example, particles close to a spherical shape are available. For example, a porous polyimide film having pores close to a spherical shape can be obtained by using a particle-dispersed polyimide precursor solution using silica particles close to a spherical shape. However, in the case of using silica particles as the particles, it is difficult to absorb the volume shrinkage in the imidization step, and thus fine cracks tend to occur in the polyimide film after imidization. In this respect as well, it is preferable to use, for example, resin particles as the particles.

In the present exemplary embodiment, the content of the particles is 5% by mass or more and 90% by mass or less with respect to the total content of the polyimide precursor and the particles. In a case where the content of the particles is within the above range, pore formation stability during production of the porous polyimide film is easily obtained, and the porous polyimide film in which uneven distribution of pores is suppressed is easily obtained, as compared with the case where the content of the particles is less than the above range. Further, in a case where the content of the particles is within the above range, a porous polyimide film having high strength is easily obtained as compared with the case where the content is larger than the above range.

The content of the particles is preferably, for example, 30% by mass or more and 85% by mass or less, and more preferably 40% by mass or more and 75% by mass or less with respect to the total content of the polyimide precursor and the particles.

Hereinafter, specific materials of the resin particles and the inorganic particles will be described.

Resin Particles

Specific examples of the resin particles include resin particles of vinyl polymers such as polystyrenes, poly(meth) acrylic acids, polyvinyl acetate, polyvinyl alcohol, polyvinyl butyral, and polyvinyl ether; condensation polymers represented by polyester, polyurethane, polyamide and the like; hydrocarbon polymers represented by polyethylene, polypropylene, polybutadiene and the like; and fluorine polymers represented by polytetrafluoroethylene, polyvinyl fluoride and the like.

Here, the term "(meth)acrylic" means to include both "acrylic" and "methacrylic". Further, the (meth)acrylic acids include (meth)acrylic acid, (meth)acrylate, and (meth)acrylamide.

The resin particles may or may not be crosslinked. In the case of crosslinking, difunctional monomers such as divinylbenzene, ethyleneglycol dimethacrylate, nonane diacrylate, and decanediol diacrylate, and polyfunctional monomers such as trimethylolpropane triacrylate and trimethylolpropane trimethacrylate may be used in combination.

In a case where the resin particles are vinyl resin particles, the resin particles are obtained by polymerizing a monomer. Examples of the vinyl resin monomer include the following monomers. Examples thereof include vinyl resin unit obtained by polymerizing a monomer: styrenes having a styrene skeleton such as styrene, an alkyl-substituted styrene (for example, a-methylstyrene, 2-methylstyrene, 3-methylstyrene, 4-methylstyrene, 2-ethylstyrene, 3-ethylstyrene, or 4-ethylstyrene), a halogen-substituted styrene (for example, 2-chlorostyrene, 3-chlorostyrene, or 4-chlorostyrene), or vinylnaphthalene; (meth)acrylates such as methyl (meth) acrylate, ethyl (meth)acrylate, n-propyl (meth)acrylate, n-butyl (meth)acrylate, lauryl (meth)acrylate, or 2-ethylhexyl (meth)acrylate; vinyl nitriles such as acrylonitrile or methacrylonitrile; vinyl ethers such as vinyl methyl ether or vinyl isobutyl ether; vinyl ketones such as vinyl methyl ketone, vinyl ethyl ketone or vinyl isopropenyl ketone; acids such as (meth)acrylic acid, maleic acid, cinnamic acid, fumaric acid, or vinylsulfonic acid; bases such as ethyleneimine, vinylpyridine, or vinylamine; and other monomers.

As the other monomer, a monofunctional monomer such as vinyl acetate may be used in combination.

The vinyl resin may be a resin which is obtained using one monomer among these monomers, or may be a resin which is copolymer obtained using two or more monomers among these monomers.

As the resin particles, for example, resin particles of polystyrenes or poly(meth)acrylic acids are preferred from the viewpoint of producability and adaptability of the particle removing step described later. Specifically, the resin particles are still more preferably, for example, resin particles of polystyrene, styrene-(meth)acrylic acid copolymers, or poly(meth)acrylic acids, and most preferably resin particles of polystyrene and poly(meth)acrylate. These resin particles may be used alone or in combination of two or more kinds thereof.

The shape of the resin particles is preferably maintained, for example, in the process of preparing the particle-dispersed polyimide precursor solution according to the present exemplary embodiment and in the process of applying the particle-dispersed polyimide precursor solution and drying the coating film (before removing the resin particles) when preparing the porous polyimide film. From this point of view, the glass transition temperature of the resin particles may be, for example, 60° C. or higher, preferably 70° C. or higher, and more preferably 80° C. or higher.

The glass transition temperature is determined from a DSC curve obtained by differential scanning calorimetry (DSC), and more specifically, it is determined by "extrapolated glass transition onset temperature" described in the method of determining the glass transition temperature in JIS K 7121-1987 "Method for measuring transition temperature of plastic".

Inorganic Particles

Specific examples of the inorganic particles include inorganic particles such as silica (silicon dioxide) particles, magnesium oxide particles, alumina particles, zirconia particles, calcium carbonate particles, calcium oxide particles, titanium dioxide particles, zinc oxide particles, and cerium oxide particles. The shape of the particles may be spherical, for example, as described above. From this viewpoint, the inorganic particles are preferably, for example, inorganic particles such as silica particles, magnesium oxide particles, calcium carbonate particles, magnesium oxide particles, and alumina particles, more preferably inorganic particles such as silica particles, titanium oxide particles, and alumina particles, and still more preferably silica particles. These inorganic particles may be used alone or in combination of two or more kinds thereof.

In a case where the wettability and dispersibility of the inorganic particles in the solvent of the particle-dispersed polyimide precursor solution are insufficient, the surfaces of the inorganic particles may optionally be modified. Examples of the surface modification method include a method of treating with an alkoxysilane having an organic group represented by a silane coupling agent; and a method of coating with an organic acid such as oxalic acid, citric acid, or lactic acid.

Solvent

The particle-dispersed polyimide precursor solution of the present exemplary embodiment contains a solvent.

The solvent is not particularly limited as long as the polyimide precursor is dissolved and the particles are not dissolved but dispersed in the particle-dispersed polyimide precursor solution. The solvent may be either an organic solvent or an aqueous solvent. The solvent may be selected according to the state in which the polyimide precursor is dissolved and the particles are not dissolved but dispersed.

Examples of the solvent include the organic solvents and aqueous solvents shown below. In a case where an aqueous solvent is used as the solvent, for example, an organic amine compound described later is preferably added to dissolve the polyimide precursor.

As the solvent, for example, an aqueous solvent is preferable from the viewpoint of environment and cost. In particular, in the case of using resin particles as the particles, since the state in which the polyimide precursor is dissolved and the particles are not dissolved but dispersed is easily obtained, for example, an aqueous solvent is preferably used.

Organic Solvent

The organic solvent is selected so that the polyimide precursor is dissolved and the particles are not dissolved but dispersed in the particle-dispersed polyimide precursor solution. In the case of selecting an organic solvent, for example, a mixed solvent of a good solvent (S1) for the polyimide precursor and a solvent (S2) other than the good solvent (S1) is preferable.

The good solvent (S1) for the polyimide precursor is used in a case where the polyimide precursor solution is prepared. In the present exemplary embodiment, the good solvent refers to a solvent in which the solubility of the polyimide precursor is 5% by mass or more. Specific examples thereof include aprotic polar solvents such as N,N-dimethylformamide, N,N-dimethylacetamide, N-methylpyrrolidone, N-ethylpyrrolidone, tetramethylurea, 1,3-dimethyl-2-imidazolidinone, dimethylpropyleneurea, dimethyl sulfoxide, γ-butyrolactone, β-propiolactone, γ-valerolactone, δ-valerolactone, and γ-caprolactone.

Among these, for example, N,N-dimethylacetamide, N-methylpyrrolidone, tetramethylurea, 1,3-dimethyl-2-imidazolidinone, dimethyl sulfoxide, and γ-butyrolactone are preferred, N,N-dimethylacetamide, N-methylpyrrolidone, tetramethylurea, dimethyl sulfoxide, and γ-butyrolactone are more preferred, and N,N-dimethylacetamide, N-methylpyrrolidone, and γ-butyrolactone are still more preferred.

As the solvent (S2) other than the good solvent for the polyimide precursor, a solvent having low solubility of the particles to be used is selected. Examples of the method of selecting a solvent include a method of adding particles to a target solvent and selecting a solvent having a dissolution amount of 3% by mass or less.

Examples of solvents (S2) other than good solvents for the polyimide precursor include hydrocarbon solvents such as n-decane and toluene; alcohol solvents such as isopropyl alcohol, 1-propanol, 1-butanol, 1-pentanol and phenethyl alcohol; glycol solvents such as ethyleneglycol, propyleneglycol, ethyleneglycol monomethylether, 1-methoxy-2-propanol, diethyleneglycol monomethylether and triethyleneglycol monomethylether; ether solvents such as diglyme, triglyme, tetraglyme and methylcellosolve acetate; and phenol solvents such as phenol and cresol.

In the case where the resin particles described above are used as the particles, the solvent (S1) alone may dissolve not only the polyimide precursor but also the resin particles because the solvent (S1) has very high polarity. Therefore, the mixing ratio of the solvent (S1) and the solvent (S2) may be determined so that the polyimide precursor is dissolved and the resin particles are not dissolved. Further, in order to prevent resin particles from being dissolved during the heating process of the coating film of the particle-dispersed polyimide precursor solution, for example, disturbing the shape of pores, the boiling point of the solvent (S2) is preferably, for example, 10° C. or higher than the temperature of the solvent (S1), and more preferably 20° C. or higher than the temperature of the solvent (1).

Aqueous Solvent

In the present specification, the aqueous solvent means an aqueous solvent containing water. Specifically, the aqueous solvent may be, for example, an aqueous solvent containing 50% by mass or more of water with respect to the total aqueous solvent. Examples of water include distilled water, ion-exchanged water, ultrafiltered water, and pure water.

The content of water is preferably, for example, 50% by mass or more and 100% by mass or less, more preferably 70% by mass or more and 100% by mass or less, and still more preferably 80% by mass or more and 100% by mass or less, with respect to the total aqueous solvent.

In a case where the aqueous solvent contains a solvent other than water, examples of the solvent other than water include a water-soluble organic solvent and an aprotic polar solvent. As the solvent other than water, for example, a water-soluble organic solvent is preferred from the viewpoint of mechanical strength of the porous polyimide film and the like. Here, water-soluble means that at 25° C., the target substance dissolves in water by 1% by mass or more.

In particular, the aqueous solvent may contain an aprotic polar solvent from the viewpoint of improving various properties (for example, transparency, mechanical strength, heat resistance, electrical properties, and solvent resistance) of the porous polyimide film. In this case, in order to suppress the dissolution and swelling of the particles in the particle-dispersed polyimide precursor solution, for example, a content of the aprotic polar solvent may be 40% by mass or less, and preferably 30% by mass or less, with respect to the total aqueous solvent. Further, in order to suppress dissolution and swelling of the resin particles in a case where the particle-dispersed polyimide precursor solution is dried to form a film, for example, 3% by mass or more and 200% by mass or less, preferably 3% by mass or more and 100% by mass or less, more preferably 3% by mass or more and 50% by mass or less, and further preferably 5% by mass or more and 50% by mass or less, with respect to the content (solid content) of the particles and the polyimide precursor in the particle-dispersed polyimide precursor solution, of the aprotic polar solvent may be used.

The water-soluble organic solvents may be used alone or in combination of two or more kinds thereof.

In a case where resin particles are used as the particles, the water-soluble organic solvent is preferably, for example, a solvent in which the resin particles do not dissolve. This is because, for example, in the case of using an aqueous solvent containing water and a water-soluble organic solvent, even in a case where the resin particles are not dissolved in the resin particle dispersion, the resin particles may be dissolved in the process of obtaining a coating film of the particle-dispersed polyimide precursor solution.

In the case of using resin particles as the particles and using a water-soluble organic solvent that dissolves the resin particles as the aqueous solvent, the amount of the water-soluble organic solvent may be, for example, 40% by mass or less, and preferably 30% by mass or less, with respect to the total aqueous solvent, in order to suppress dissolution and swelling of the particles in the particle-dispersed polyimide precursor solution. Further, in order to suppress the dissolution and swelling of the resin particles in a case where the coating film of the particle-dispersed polyimide precursor solution is dried to form a film, the amount of the water-soluble organic solvent used may be, for example, 3% by mass or more and 50% by mass or less, preferably 5% by mass or more and 40% by mass or less, and more preferably 5% by mass or more and 35% by mass or less with respect to the total amount of the particles and the polyimide precursor in the particle-dispersed polyimide precursor solution.

Examples of the water-soluble organic solvent include the following water-soluble ether solvents, water-soluble ketone solvents, and water-soluble alcohol solvents.

The water-soluble ether-based solvent is a water-soluble organic solvent having an ether bond in one molecule. Examples of the water-soluble ether-based solvent include tetrahydrofuran (THF), dioxane, trioxane, 1,2-dimethoxyethane, diethylene glycol dimethyl ether, and diethylene glycol diethyl ether. Among these, the water-soluble ether-based solvent is, for example, preferably tetrahydrofuran or dioxane.

The water-soluble ketone-based solvent is a water-soluble organic solvent having a ketone group in one molecule. Examples of the water-soluble ketone-based solvent include acetone, methyl ethyl ketone, and cyclohexanone. Among these, the water-soluble ketone-based solvent is, for example, preferably acetone.

The water-soluble alcohol-based solvent is a water-soluble organic solvent having an alcoholic hydroxyl group in one molecule. Examples of the water-soluble alcohol-based solvent include methanol, ethanol, 1-propanol, 2-propanol, tert-butyl alcohol, ethylene glycol, ethylene glycol monoalkyl ether, propyleneglycol, propyleneglycol monoalkyl ether, diethylene glycol, diethylene glycol monoalkyl ether, 1,2-propanediol, 1,3-propanediol, 1,3-butanediol, 1,4-butanediol, 2,3-butanediol, 1,5-pentanediol, 2-butene-1,4-diol, 2-methyl-2,4-pentanediol, glycerin, 2-ethyl-2-hydroxymethyl-1,3-propanediol, and 1,2,6-hexanetriol. Among these, preferred as the water-soluble alcohol-based solvent are, for example, methanol, ethanol, 2-propanol, ethylene glycol, ethylene glycol monoalkyl ether, propylene glycol, propylene glycol monoalkyl ether, diethylene glycol, and diethylene glycol monoalkyl ether.

In a case where an aprotic polar solvent other than water is contained as the aqueous solvent, the aprotic polar solvent to be used in combination is an organic solvent having a boiling point of 150° C. or higher and 300° C. or lower and a dipole moment of 3.0 D or more and 5.0 D or less. Specific examples of the aprotonic polar solvent include N-methyl-2-pyrrolidone (NMP), N,N-dimethylformamide (DMF), N,N-dimethylacetamide (DMAc), dimethyl sulfoxide (DMSO), hexamethylenephosphoramide (HMPA), N-methylcaprolactam, N-acetyl-2-pyrrolidone, 1,3-dimethyl-2-imidazolidinone (DMI), N,N'-dimethylpropyleneurea, tetramethylurea, trimethyl phosphate, and triethyl phosphate.

In a case where a solvent other than water is contained as the aqueous solvent, the solvent to be used in combination may have, for example, a boiling point of 270° C. or lower, preferably 60° C. or higher and 250° C. or lower, and more preferably 80° C. or higher and 230° C. or lower. In a case where the boiling point of the solvent to be used in combination is within the above range, the solvent other than water is less likely to remain in the porous polyimide molded body, and a polyimide molded body having high mechanical strength can be easily obtained.

Here, when an aqueous solvent is used as the solvent, for example, an aqueous solvent which contains an organic amine compound described below and in which the ratio of water in the total solvent is 50% by mass or more is preferable. In a case where an aqueous solvent containing an organic amine compound and having a water content of 50% by mass or more is used, the particle-dispersed polyimide precursor solution is excellent in the dispersion stability of the particles as compared with the case of using an aqueous solvent having a water content of less than 50% by mass. The reason is unclear, but it is presumed that the aqueous solvent having a water ratio of 50% or more may suppress the swelling of the particles and suppress the fusion of the particles.

Further, the aqueous solvent may contain an aprotic polar solvent in a range of 5 parts by mass or more and 50 parts by mass or less with respect to 100 parts by mass of the particles. In a case where the content of the aprotic polar solvent is in the above range, the particle-dispersed polyimide precursor solution is excellent in the dispersion stability of the particles as compared with the case where the content is less than the above range. The reason is unclear, but it is presumed that the dissolution stability of the polyimide precursor in the particle-dispersed polyimide precursor solution is enhanced and the molecular chain of the polyimide precursor is expanded, whereby the molecular chain of the polyimide precursor is likely to come into contact with the particle surface.

Organic Amine Compound

In a case where the solvent is an aqueous solvent, an organic amine compound is added in water and water-solubilized to dissolve the polyimide precursor. The organic amine compound is a compound which makes the polyimide precursor (its carboxy group) into an amine salt) and enhances the solubility thereof in the aqueous solvent and also functions as an imidization accelerator. Specifically, the organic amine compound may be, for example, an amine compound having a molecular weight of 170 or less. The organic amine compound may be, for example, a compound other than diamine compound, which is a raw material of the polyimide precursor.

The organic amine compound may be, for example, a water-soluble compound. Water-soluble means that at 25° C., the target substance dissolves in water by 1% by mass or more.

Examples of the organic amine compound include a primary amine compound, a secondary amine compound, and a tertiary amine compound.

Among these, the organic amine compound may be, for example, at least one selected from the group consisting of a secondary amine compound or a tertiary amine compound (particularly, a tertiary amine compound). In a case where a tertiary amine compound or a secondary amine compound is applied as the organic amine compound (particularly, the tertiary amine compound), the solubility of the polyimide precursor in the solvent is easily increased, the film-forming property is easily improved, and the storage stability of the polyimide precursor solution is easily improved.

In addition to monovalent amine compounds, examples of organic amine compounds include divalent or higher polyvalent amine compounds. In a case where a polyvalent amine compound of divalent or higher is applied, a pseudo-crosslinked structure is easily formed between the molecules of the polyimide precursor, and the storage stability of the polyimide precursor solution is easily improved.

Examples of the primary amine compound include methylamine, ethylamine, n-propylamine, isopropylamine, 2-ethanolamine, and 2-amino-2-methyl-1-propanol.

Examples of the secondary amine compound include dimethylamine, 2-(methylamino) ethanol, 2-(ethylamino) ethanol, and morpholine.

Examples of the tertiary amine compound include 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, and 2-ethyl-4-methylimidazole.

From the viewpoint of pot life of the polyimide precursor solution and film thickness uniformity, for example, a tertiary amine compound is preferable. In this regard, the organic amine compound is, for example, more preferably at least one selected from the group consisting of 2-dimethylaminoethanol, 2-diethylaminoethanol, 2-dimethylaminopropanol, pyridine, triethylamine, picoline, N-methylmorpholine, N-ethylmorpholine, 1,2-dimethylimidazole, 2-ethyl-4-methylimidazole, N-methylpiperidine, and N-ethylpiperidine. Furthermore, the organic amine compound is, for example, most preferably at least one selected from the group consisting of 2-dimethylaminoethanol, 2-diethylaminoethanol, 2-dimethylaminopropanol, triethylamine, N-methylmorpholine, N-ethylmorpholine, 1,2-dimethylimidazole, 2-ethyl-4-methylimidazole, N-methylpiperidine, and N-ethylpiperidine.

Here, the organic amine compound is also preferably, for example, an amine compound having a heterocyclic structure containing nitrogen (particularly, a tertiary amine compound) from the viewpoint of film-forming property. Examples of the amine compound having a heterocyclic structure containing nitrogen (hereinafter referred to as "nitrogen-containing heterocyclic amine compound") include isoquinolins (amine compounds having an isoquinolin skeleton), pyridines (amine compounds having a pyridine skeleton), pyrimidines (amine compounds having a pyrimidine skeleton), pyrazines (amine compounds having a pyrazine skeleton), piperazines (amine compounds having a piperazine skeleton), triazines (amine compounds having a triazine skeleton), imidazoles (amine compounds having an imidazole skeleton), morpholines (amine compounds having a morpholine skeleton), polyaniline, polypyridine, and polyamine.

The nitrogen-containing heterocyclic amine compound is preferably, for example, at least one selected from the group consisting of morpholines, pyridines, piperidines, and imidazoles, and more preferably morpholines (amine compounds having a morpholine skeleton), from the viewpoint of film-forming property. Among these, more preferred is, for example, at least one selected from the group consisting of N-methylmorpholine, N-methylpiperidine, pyridine, 1,2-dimethylimidazole, 2-ethyl-4-methylimidazole, and picoline, and still more preferably N-methylmorpholine.

Among these, the organic amine compound may be, for example, a compound having a boiling point of 60° C. or higher (preferably 60° C. or higher and 200° C. or lower, and more preferably 70° C. or higher and 150° C. or lower). In a case where the boiling point of the organic amine compound is 60° C. or higher, the organic amine compound is suppressed from volatilizing from the polyimide precursor solution during storage, and the decrease in solubility of the polyimide precursor in the solvent is easily suppressed.

The organic amine compound may be, for example, contained in an amount of 50 mol % or more and 500 mol % or less, preferably 80 mol % or more and 250 mol % or less, more preferably 90 mol % or more and 200 mol % or less, with respect to the carboxy group (—COOH) of the polyimide precursor in the polyimide precursor solution.

In a case where the content of the organic amine compound is within the above range, the solubility of the polyimide precursor in the aqueous solvent is more easily increased, and the film-forming quality is easily improved. Further, the storage stability of the polyimide precursor solution can be easily improved.

The above organic amine compounds may be used alone or in combination of two or more kinds thereof.

Other Additives

The particle-dispersed polyimide precursor solution according to the present exemplary embodiment may contain a catalyst for promoting the imidization reaction, a leveling agent for improving film quality, or the like.

The catalyst for promoting the imidization reaction to be used may be a dehydrating agent such as an acid anhydride, an acid catalyst such as a phenol derivative, a sulfonic acid derivative, a benzoic acid derivative, or the like.

Further, the polyimide precursor solution may contain, for example, a conductive material added for imparting conductivity (conductive (for example, a volume resistivity of less than $10^7$ Ω·cm) or semiconductive material (for example, a volume resistivity of $10^7$ Ω·cm or more and $10^{13}$ Ω·cm or less)).

Examples of the conductive material include carbon black (for example, acidic carbon black having a pH of 5.0 or less); metals (for example, aluminum or nickel); metal oxides (for example, yttrium oxide, or tin oxide); ion conductive materials (for example, potassium titanate, or LiCl); and the like. These conductive materials may be used alone or in combination of two or more kinds thereof.

Further, the particle-dispersed polyimide precursor solution according to the present exemplary embodiment may contain $LiCoO_2$, $LiMn_2O$, and the like used as electrodes of a lithium ion battery.

Method of Preparing Particle-Dispersed Polyimide Precursor Solution

Examples of the method for preparing the particle-dispersed polyimide precursor solution according to the present exemplary embodiment include the methods according to (i) and (ii) below.

(i) Method of preparing a solution of a polyimide precursor and then mixing and dispersing the solution with particles (ii) Method of preparing a particle dispersion and synthesizing a polyimide precursor in the dispersion (i) Method of Preparing Solution of Polyimide Precursor and then Mixing and Dispersing Solution with Particles First, examples of the method of preparing solution of polyimide precursor before dispersing the particles include a method in which a solution of the polyimide precursor is obtained by polymerizing a tetracarboxylic dianhydride and a diamine compound in a solvent using a known method to produce a resin (polyimide precursor).

In the case of an aqueous solvent, the aqueous solvent described above is used and polymerization is carried out in the presence of an organic amine to obtain a solution of the polyimide precursor. As another example, a resin (polyimide precursor) is produced by polymerizing a tetracarboxylic dianhydride and a diamine compound in an organic solvent such as an aprotic polar solvent (for example, N-methylpyrrolidone (NMP) or the like), and then the resin (polyimide precursor) is precipitated by introducing the resin into an aqueous solvent such as water or alcohol. Thereafter, the polyimide precursor and the organic amine compound are dissolved in an aqueous solvent to obtain a solution of the polyimide precursor.

Next, the obtained solution of the polyimide precursor and the particles are mixed and dispersed.

In the case of preparing the resin particles, for example, in a case where the resin particles are vinyl resin particles, the resin particles may be prepared in an aqueous solvent by a known polymerization method (radical polymerization method such as emulsion polymerization, soap-free emulsion polymerization, suspension polymerization, mini-emulsion polymerization, or microemulsion polymerization).

For example, in a case where an emulsion polymerization method is applied to the production of vinyl resin particles, monomers such as styrenes and (meth)acrylic acids are added to an aqueous solvent in which a water-soluble polymerization initiator such as potassium persulfate and ammonium persulfate has been dissolved. Further, as necessary, a surfactant such as sodium dodecyl sulfate or diphenyl oxide disulfonate is added, and polymerization is performed by heating while stirring, thereby obtaining vinyl resin particles.

In a case where the particle-dispersed polyimide precursor solution according to the present exemplary embodiment is prepared in an aqueous solvent, the particle-dispersed polyimide precursor solution is obtained by mixing and stirring the aqueous solvent dispersion of the resin particles obtained by the method described above and the polyimide precursor solution obtained as described above.

In a case where the particle-dispersed polyimide precursor solution according to the present exemplary embodiment is prepared in an organic solvent, the resin particles are taken out as a powder from the aqueous solvent dispersion of the resin particles by a known method such as reprecipitation or freeze-drying, and mixed and stirred with the polyimide precursor solution obtained as described above. Alternatively, the resin particle powder taken out may be redispersed in an organic solvent that does not dissolve the resin particles (either alone or in a mixed solvent), and then mixed and stirred with the polyimide precursor solution.

The mixing, stirring, and dispersing methods are not particularly limited. Further, in order to improve the dispersibility of the particles, a known nonionic or ionic surfactant may be added.

In the case of using commercially available particles (resin particles or inorganic particles), when the particles are available as a powder, the particles can be mixed and dispersed at a target concentration regardless of whether the solvent of the polyimide precursor solution is an organic solvent or an aqueous solvent. When the particles are available in the form of a dispersion of particles, the dispersion of particles and the polyimide precursor solution obtained as described above are mixed and dispersed to prepare a particle-dispersed polyimide precursor solution in the same manner as in the preparation of the particles described above.

(ii) Method for Preparing Particle Dispersion and Preparing Polyimide Precursor in the Dispersion.

In a case where the particle-dispersed polyimide precursor solution according to the present exemplary embodiment is prepared using an organic solvent, first, a dispersion in which particles are dispersed in an organic solvent in which the particles are not dissolved and the polyimide precursor is dissolved is prepared. Next, in the dispersion, the tetracarboxylic dianhydride and the diamine compound are polymerized to generate a resin (polyimide precursor) to obtain a particle-dispersed polyimide precursor solution.

In a case where the particle-dispersed polyimide precursor solution according to the present exemplary embodiment is prepared using an aqueous solvent (aqueous solvent), first, an aqueous solvent dispersion of particles is prepared. Next, in the dispersion and in the presence of an organic amine, the tetracarboxylic dianhydride and the diamine compound are polymerized to generate a resin (polyimide precursor) to obtain a particle-dispersed polyimide precursor solution.

In the case of using resin particles as the particles, the surfaces of the resin particles may be coated with a resin having a chemical structure different from the chemical structure of the original resin in order to improve dispersibility in the particle-dispersed polyimide precursor solution according to the present exemplary embodiment. The resin to be coated may be changed depending on the solvent used and the chemical structure of the polyimide precursor. Examples of the resin to be coated include a resin having an acidic group or a basic group. Examples of the method of coating the surface of the resin particle with the resin include a method in which, in a case where the vinyl resin particle is produced by emulsion polymerization, a small amount of a monomer having an acidic group or a basic group, such as methacrylic acid or 2-dimethylaminoethyl methacrylate, is further added after completion of polymerization of a monomer derived from the original resin particle to continue the polymerization.

Among these, as a method for preparing the particle-dispersed polyimide precursor solution according to the present exemplary embodiment, for example, the method (ii) described above is preferable in that the particle dispersibility can be further improved.

Method for Producing Porous Polyimide Film

The method for producing a porous polyimide film according to the present exemplary embodiment includes a first step of applying the particle-dispersed polyimide precursor solution described above on a substrate to form a coating film and then drying the coating film to form a film containing the polyimide precursor and the resin particles, and a second step of heating the film to imidize the polyimide precursor to form a polyimide film, the second step including a process of removing the resin particles.

Here, according to the method for producing a porous polyimide film according to the present exemplary embodiment, a porous polyimide film having spherical pores can be obtained by using spherical particles.

Hereinafter, an example of a method for producing a porous polyimide film according to the present exemplary embodiment will be described with reference to the drawings.

FIG. 1 is a schematic view showing a structure of a porous polyimide film obtained by the method for producing a porous polyimide film according to the present exemplary embodiment.

In the reference numerals in FIG. 1, 31 represents a substrate, 51 represents a release layer, 10A represents pores, and 10 represents a porous polyimide film.

First Step

In the first step, first, the particle-dispersed polyimide precursor solution described above is prepared. Next, the particle-dispersed polyimide precursor solution is applied onto a substrate to form a coating film, and then the coating film is dried to form a film containing the polyimide precursor and the particles.

The coating film is formed by applying the particle-dispersed polyimide precursor solution obtained by the above-described method onto a substrate. The resulting coating film contains at least a polyimide precursor, particles, and a solvent. Also, the particles in the coating film are distributed in a state where aggregation is suppressed.

The substrate to which the particle-dispersed polyimide precursor solution is applied (the substrate 31 in FIG. 1) is not particularly limited.

Examples of the substrate include resin substrates such as polystyrene and polyethylene terephthalate; glass substrates; ceramic substrates; metal substrates such as iron and stainless steel (SUS); and composite material substrates in which these materials are combined.

Further, as necessary, the substrate may be provided with a release layer (release layer 51 in FIG. 1) by performing a release treatment with, for example, a silicone-based or fluorine-based release agent. It is also effective to roughen the surface of the substrate to a size of about the particle size of the particles to promote the exposure of the particles on the substrate contact surface.

The method for applying the particle-dispersed polyimide precursor solution on the substrate is not particularly limited, and examples thereof include various methods such as a spray coating method, a spin coating method, a roll coating method, a bar coating method, a slit die coating method, and an inkjet coating method.

The applying amount of the particle-dispersed polyimide precursor solution containing the polyimide precursor and the particles may be set to an amount capable of obtaining a predetermined film thickness.

As the base material, various base materials may be used depending on the intended application. Examples of the base material include various base materials applied to a liquid crystal element; a semiconductor base material on which an integrated circuit is formed, a wiring base material on which wiring is formed, a base material of a printed circuit board on which an electronic component and wiring are provided; and a base material for an electric wire coating material.

The film is formed by drying the coating film formed on the substrate. The film contains at least a polyimide precursor and particles.

The method for drying the coating film formed on the substrate is not particularly limited, and examples thereof include various methods such as heat drying, natural drying, and vacuum drying.

More specifically, the film is preferably, for example, formed by drying the coating film so that the solvent remaining in the film is 50% by mass or less (preferably 30% by mass or less), with respect to the solid content of the film.

Second Step

The second step is a step of heating the film obtained in the first step to imidize the polyimide precursor to form a polyimide film, and includes a process of removing the particles. A porous polyimide film is obtained through the process of removing particles.

In the second step, specifically, the polyimide film is formed by heating the film obtained in the first step and advancing imidization. As the imidization progresses and the imidization rate increases, the polyimide film becomes difficult to dissolve in a solvent.

Then, in the second step, a process of removing particles is performed. By removing the particles, the region where the particles existed becomes pores (pores 10A in FIG. 1), and a porous polyimide film (porous polyimide film 10 in FIG. 1) is obtained.

The particles may be removed in the process of heating the film to imidize the polyimide precursor, or may be removed from the polyimide film after the imidization is completed (after imidization).

In the present exemplary embodiment, the process of imidizing the polyimide precursor refers to a process of heating the film containing the polyimide precursor and the particles obtained in the first step to advance imidization to a state before the polyimide film is formed after imidization is completed.

The process of removing the particles is preferably performed, for example, in a case where the imidization rate of the polyimide precursor in the polyimide film is 10% or more in the process of imidizing the polyimide precursor in terms of particle removability and the like. In a case where the imidization rate is 10% or more, the shape of the film is easily maintained.

Removal of Particles

Next, the process of removing the particles will be described.

First, a process for removing resin particles will be described.

Examples of the process of removing the resin particles include a method of removing the resin particles by heating, a method of removing the resin particles with an organic solvent that dissolves the resin particles, and a method of removing the resin particles by decomposition with a laser or the like. Of these, for example, a method of removing the resin particles by heating and a method of removing the resin particles with an organic solvent that dissolves the resin particles are preferred.

In the method of removing by heating, for example, in the process of imidizing the polyimide precursor, the resin particles may be removed by decomposing the resin particles by heating for advancing the imidization. In this case, there is no operation of removing the resin particles with an organic solvent, which is advantageous for reducing the number of steps. On the other hand, depending on the type of resin particles, decomposition gas may be generated by heating. Due to the decomposition gas, the porous polyimide film may be broken or cracked. Therefore, in this case, for example, it is desirable to adopt a method of removing the resin particles with an organic solvent that dissolves the resin particles.

Examples of the method of removing the resin particles with an organic solvent that dissolves the resin particles include a method of allowing the resin particles to contact with the organic solvent (for example, immersing in an organic solvent) the organic solvent in which the resin particles are dissolved to dissolve and remove the resin particles. The method of immersing in an organic solvent is preferable in, for example, that the dissolution efficiency of the resin particles is increased.

The organic solvent for removing the resin particles is not particularly limited as long as the organic solvent does not dissolve the polyimide film and the polyimide film after imidization is completed, and the resin particles are soluble therein. Examples of the organic solvent include ethers such as tetrahydrofuran (THF); aromatics such as toluene; ketones such as acetone; and esters such as ethyl acetate.

In a case where the resin particles are removed and made porous by dissolution removal, for example, it is preferable to use resin particles that are soluble in a general-purpose solvent such as tetrahydrofuran, acetone, toluene, or ethyl acetate. Further, depending on the resin particles and the polyimide precursor to be used, water can also be used as a solvent for removing the resin particles.

In a case where the resin particles are removed and made porous by heating, the resin particles are not decomposed at a drying temperature after applying, but are thermally decomposed at a temperature for imidizing the film of the polyimide precursor. From this point of view, the thermal decomposition start temperature of the resin particles may be, for example, 150° C. or higher and 320° C. or lower, preferably 180° C. or higher and 300° C. or lower, and more preferably 200° C. or higher and 280° C. or lower.

Next, the process of removing the inorganic particles will be described.

Examples of the process of removing the inorganic particles include a method of removing the inorganic particles using a liquid (hereinafter, may be referred to as "particle removing solution") in which the inorganic particles are dissolved but the polyimide precursor or the polyimide is not dissolved. The particle removing solution is selected according to the type of inorganic particles to be used. Examples of the particle removing solution include aqueous solutions of acids such as hydrofluoric acid, hydrochloric acid, hydrobromic acid, boric acid, perchloric acid, phosphoric acid, sulfuric acid, nitric acid, acetic acid, trifluoroacetic acid, and citric acid; aqueous solutions of bases such as sodium hydroxide, potassium hydroxide, tetramethylammonium hydroxide, sodium carbonate, potassium carbonate, ammonia, and the above-mentioned organic amines. Further, depending on the inorganic particles and the polyimide precursor used, water alone can be used as the particle removing solution.

In the second step, for heating to imidize the polyimide precursor in the film, for example, heating in two or more stages is preferably used. Specifically, for example, the following heating conditions are adopted.

As the heating condition of the first stage, for example, it is desirable that the temperature is such that the shape of the particles is maintained. Specifically, for example, the heating temperature in the first stage may be in the range of 50° C. or higher and 150° C. or lower, preferably in the range of 60° C. or higher and 140° C. or lower. The heating time in the first stage is preferably in the range of 10 minutes or more and 60 minutes or less, for example. The higher the heating temperature in the first stage, the shorter the heating time in the first stage may be.

Examples of the heating conditions of the second stage include conditions of 150° C. or higher and 450° C. or lower (preferably 200° C. or higher and 400° C. or lower) for 20 minutes or more and 120 minutes or less. By setting the heating conditions in this range, the imidization reaction further proceeds. During the heating reaction, the temperature is, for example, preferably increased in stages or gradually at a constant rate before the final temperature of heating is reached.

The heating conditions are not limited to the above two-stage heating method, and for example, a one-stage heating method may be adopted. In the case of the one-stage heating method, for example, the imidization may be completed only by the heating conditions shown in the above second stage.

In the second step, in terms of increasing the aperture ratio, for example, it is preferable to perform a process of exposing the particles so that the particles are exposed. In the second step, the process of exposing the particles is preferably performed, for example, in the process of imidizing the polyimide precursor, or after the imidization and before the process of removing the particles.

In a case where a film is formed on a substrate using a particle-dispersed polyimide precursor solution, the particle-dispersed polyimide precursor solution is applied onto the substrate to form a coating film in which particles are embedded, and then the coating film is dried to form a film containing the polyimide precursor and the particles. The film formed by this method is in a state in which particles are embedded. The film may be subjected to a process of imidizing the polyimide precursor or a process of exposing the particles from the polyimide film after the imidization is completed (after imidization) before heating and removing the particles.

In the second step, the process of exposing the particles may be performed, for example, when the polyimide film is in the following state.

In a case where the imidization rate of the polyimide precursor in the polyimide film is less than 10% (that is, in a state in which the polyimide film can be dissolved in the solvent), the process of exposing the particles embedded in the polyimide film include a wiping process, a process of immersing the particles in a solvent, and the like. The solvent used at that time may be the same as or different from the solvent used for the particle-dispersed polyimide precursor solution according to the present exemplary embodiment.

Further, examples thereof also include, in a case where the imidization rate of the polyimide precursor in the polyimide film is 10% or more (that is, in a state in which it is difficult to dissolve in water or an organic solvent), and in a case where the polyimide film has undergone imidization, a method of exposing the particles by mechanically cutting the particles with a tool such as a paper file, and in a case where the particles are resin particles, a method of exposing the resin particles by decomposing the particles with a laser or the like.

For example, in the case of mechanical cutting, a portion of the particles present in the upper region (that is, the region of the particles away from the substrate) of the particles embedded in the polyimide film are cut together with the polyimide film present in the upper region of the particles, and the cut particles are exposed from the surface of the polyimide film.

Thereafter, the particles are removed from the exposed polyimide film by the above-mentioned particle removing process. Then, a porous polyimide film from which particles have been removed is obtained.

In the above description, the production step of the porous polyimide film subjected to the process of exposing the particles in the second step has been described, but in terms of increasing the aperture ratio, the process of exposing the particles may also be performed in the first step. In this case, in the first step, after obtaining the coating film, the particles may be exposed by performing the process of exposing in the process of drying to form the film. By performing the treatment for exposing the particles, the aperture ratio of the porous polyimide film can be increased.

For example, in the process of obtaining a coating film and then drying the coating film to form a film, as described above, the polyimide precursor is in a state where the polyimide precursor can be dissolved in a solvent in the film. In a case where the film is in this state, the particles may be exposed by, for example, a wiping process or a process of immersing the particles in a solvent. Specifically, the polyimide precursor solution existing in the region of the thickness or more of the particle layer is removed by, for example, wiping the polyimide precursor solution existing in the region of the thickness or more of the particle layer with a solvent to expose the particle layer. Then, the particles existing in the upper region of the particle layer (that is, the region on the side of the particle layer away from the substrate) are exposed from the surface of the film.

In a case where it is preferable to have a skin layer having no pores on the surface such as a gas separation membrane, for example, a treatment for exposing the particles may not be performed.

In the second step, the substrate for forming the above-mentioned film used in the first step may be peeled off when the film becomes dry, may be peeled off when the polyimide precursor in the polyimide film becomes difficult to dissolve in the organic solvent, and may be peeled off when imidization is completed and the film is formed.

Through the above steps, a porous polyimide film is obtained. Then, the porous polyimide film may be post-processed depending on the purpose of use.

The particle-dispersed polyimide precursor solution of the present exemplary embodiment may be subjected to a defoaming process before forming a coating film of the particle-dispersed polyimide precursor solution. It is desired to perform defoaming process, for example, because a film in which defects in the case of forming a porous polyimide film are suppressed is easily obtained as compared with the case of not performing defoaming process. The method of defoaming process is not particularly limited, and defoaming under reduced pressure (defoaming under reduced pressure) may be used, or defoaming under normal pressure may be used. Examples of the defoaming process under normal pressure include a method of applying centrifugal force such as rotation and revolution. The defoaming process may be carried out under normal pressure or under reduced pressure, or may be carried out with stirring or heating, as necessary. The defoaming process is desired, for example, because the defoaming process under reduced pressure is simple and the defoaming ability is large. The conditions for the defoaming process may be set according to the degree of residual bubbles.

That is, the method for producing a porous polyimide film may be a method including a first step of applying the particle-dispersed polyimide precursor solution according to the present exemplary embodiment to form a coating film and then drying the coating film to form a film containing the polyimide precursor and the particles, the first step including a defoaming process of the particle-dispersed polyimide precursor solution before forming the coating film; and a second step of heating the film to imidize the polyimide precursor to form a polyimide film, the second step including a process of removing the particles.

Imidization Rate

Here, the imidization rate of the polyimide precursor will be described.

Examples of the partially imidized polyimide precursor include precursors having a structure having a unit represented by the following general formula (I-1), the following general formula (I-2), or the following general formula (I-3).

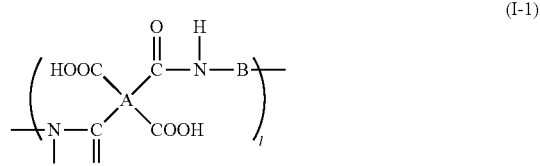

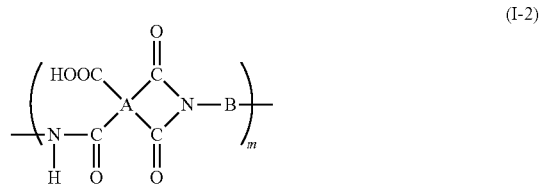

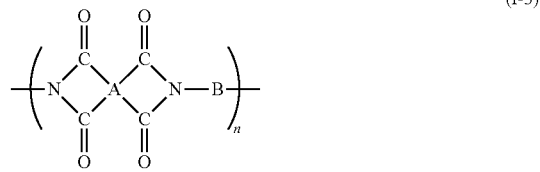

In the general formula (I-1), the general formula (I-2), and the general formula (I-3), A represents a tetravalent organic group and B represents a divalent organic group. l represents an integer of 1 or more, and m and n each independently represent 0 or an integer of 1 or more.

A in the general formulas (I-1), (I-2), and (I-3) has the same meaning as A in the general formula (I) described above.

Further, B in the general formulas (I-1), (I-2), and (I-3) has the same meaning as a residue obtained by removing two amino groups from a diamine compound in the specific unit and the other unit described above.

The imidization rate of the polyimide precursor represents the ratio of the number of imide-ring closure bonds (2n+m) to the total number of bonds (2l+2m+2n) in the bonds of the polyimide precursor (reaction portion of tetracarboxylic dianhydride and diamine compound). That is, the imidization rate of the polyimide precursor is represented by "(2n+m)/(2l+2m+2n)".

The imidization rate (value of "(2n+m)/(2l+2m+2n)") of the polyimide precursor is measured by the following method.

Measurement of Imidization Rate of Polyimide Precursor
Preparation of Polyimide Precursor Sample
(i) The polyimide precursor solution to be measured is applied onto a silicon wafer in a film thickness range of 1 μm or more and 10 μm or less to prepare a coating film sample.
(ii) The coating film sample is immersed in tetrahydrofuran (THF) for 20 minutes to replace the solvent in the coating film sample with tetrahydrofuran (THF). The solvent to be immersed is not limited to THF, and is selected from a solvent that does not dissolve the polyimide precursor and can be miscible with the solvent component contained in the polyimide precursor solution. Specifically, alcohol solvents such as methanol and ethanol, and ether compounds such as dioxane are used.
(iii) The coating film sample is taken out from the THF, and $N_2$ gas is blown to the THF adhered to the surface of the coating film sample to remove THF. Under a reduced pressure of 10 mmHg or less, the coating film sample is dried for 12 hours or more in the range of 5° C. or more and 25° C. or less to prepare a polyimide precursor sample.

Preparation of 100% Imidized Standard Sample
(iv) In the same manner as in (i) above, the polyimide precursor solution to be measured is applied onto a silicon wafer to prepare a coating film sample.
(v) The coating film sample is heated at 380° C. for 60 minutes to perform an imidization reaction to prepare a 100% imidized standard sample.

Measurement and Analysis
(vi) Using a Fourier transform infrared spectrophotometer (FT-730 manufactured by Horiba Seisakusho), the infrared absorption spectra of the 100% imidized standard sample and the polyimide precursor sample are measured. The ratio I'(100) of the absorption peak derived from the imide bond near 1780 cm$^{-1}$ (Ab' (1780 cm$^{-1}$)) to the absorption peak derived from the aromatic ring near 1500 cm$^{-1}$ (Ab' (1500 cm$^{-1}$)) of the 100% imidized standard sample is determined.
(vii) Similarly, the polyimide precursor sample is measured, and the ratio I(x) of the absorption peak derived from the imide bond near 1780 cm$^{-1}$ (Ab(1780 cm$^{-1}$)) to the absorption peak derived from the aromatic ring near 1500 cm$^{-1}$ (Ab(1500 cm$^{-1}$)) is determined.

Then, the measured absorption peaks I'(100) and I(x) are used to calculate the imidization rate of the polyimide precursor based on the following formula.

imidization rate of polyimide precursor=$I(x)/I'(100)$   Formula:

$I'(100)=(Ab'(1780\ cm^{-1}))/(Ab'(1500\ cm^{-1}))$   Formula: I'

$I(x)=(Ab(1780\ cm^{-1}))/(Ab(1500\ cm^{-1}))$   Formula:

The measurement of the imidization rate of this polyimide precursor is applied to the measurement of the imidization rate of the aromatic polyimide precursor. In the case of measuring the imidization rate of the aliphatic polyimide precursor, a peak derived from a structure that does not change before and after the imidization reaction is used as an internal standard peak instead of the absorption peak of the aromatic ring.

Porous Polyimide Film

The porous polyimide film according to the present exemplary embodiment contains a polyimide having a unit represented by the following formula (III), has pores, and satisfies the following condition (5):

Condition (5): a total content of the groups represented by the formulas (B1) to (B4) is 1% by mass or more and 40% by mass or less with respect to a total amount of the polyimide.

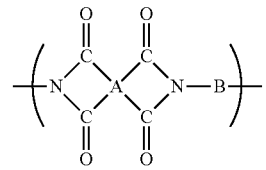

(III)

In the formula (III),
A represents a tetravalent organic group, and
B represents a divalent organic group represented by any of the formulas (B1) to (B4).

A and B in the general formula (III) have the same meanings as A and B in the general formula (I) described above.

Characteristics of Porous Polyimide Film

The porosity of the porous polyimide film is not particularly limited. The porosity of the porous polyimide film is, for example, preferably 30% or more, preferably 40% or more, and more preferably 50% or more. The upper limit of the porosity is not particularly limited, and the porosity may be in the range of 90% or less.

Here, the porosity of the porous polyimide film is obtained from the apparent density and the true density of the porous polyimide film.

The apparent density d is a value obtained by dividing the mass (g) of the porous polyimide film by the volume (cm$^3$) of the porous polyimide film including pores. The apparent density d may be obtained by dividing the mass (g/m$^2$) per unit area of the porous polyimide film by the thickness (μm) of the porous polyimide film.

The true density ρ is a value obtained by dividing the mass (g) of the porous polyimide film by the volume (cm$^3$) of the porous polyimide film excluding the pores from the porous polyimide film (that is, the volume of only the skeleton portion made of resin).

The porosity of the porous polyimide film is calculated by the following equation (II).

$$\text{Porosity (\%)} = \{1-(d/\rho)\} \times 100 = [1-\{(w/t)/\rho)\}] \times 100 \quad \text{Equation (II)}$$

d: Apparent density of porous polyimide film (g/cm³)
ρ: True density of porous polyimide film (g/cm³)
w: Mass per unit area of porous polyimide film (g/m²)
t: Thickness of porous polyimide film (μm)

The shape of the pores is preferably, for example, a spherical shape or a shape close to a spherical shape. Further, the pores are preferably in a shape in which the pores are connected to each other and connected to each other, for example.

The average value of the pore diameter is not particularly limited, but is preferably in the range of 0.1 μm or more and 0.5 μm or less, preferably in the range of 0.25 μm or more and 0.48 μm or less, and more preferably in the range of 0.25 μm or more and 0.45 μm or less.

The average value of the pore diameter is a value observed and measured by a scanning electron microscope (SEM). Specifically, first, a porous polyimide film is cut out in the thickness direction, and a measurement sample having the cut surface as the measurement surface is prepared. Then, the sample for measurement is observed and measured by VE SEM manufactured by KEYENCE Corporation using image processing software provided as a standard. The observation and measurement are performed 100 times for each of the pore portions in the cross-section of the measurement sample, the distribution of the pore diameters is obtained, and the average value of the pore diameters is obtained by averaging these values. In a case where the shape of the pores is not circular, the longest portion is defined as the diameter.

The average film thickness of the porous polyimide film is not particularly limited and is selected depending on the application.

The average film thickness of the porous polyimide film may be, for example, 10 μm or more and 1000 μm or less. The average film thickness of the porous polyimide film may be 20 μm or more, 30 μm or more, and the average film thickness of the porous polyimide film may be 500 μm or less, or 400 μm or less.

The average film thickness of the porous polyimide film is calculated by the arithmetic average of the five points of the film thickness of the porous polyimide film measured using an eddy current thickness meter CTR-1500E manufactured by Sanko Electronics.

Applications of Porous Polyimide Film

Examples of applications to which the porous polyimide film of the present exemplary embodiment is applied include a battery separator for a lithium battery and the like; a separator for an electrolytic capacitor; an electrolyte membrane such as a fuel cell; a battery electrode material; a gas or liquid separation membrane; a low dielectric constant material; and a filtration membrane.

EXAMPLES

Examples will be described below, but the present invention is not limited to these examples. In the following description, all "parts" and "%" are based on mass unless otherwise specified.

SYNTHESIS EXAMPLES

Synthesis Example 1 (Preparation of PMMA Particle Dispersion-1)

670 parts by mass of methyl methacrylate, 25.0 parts by mass of the surfactant Dowfax2A1 (47% solution, manufactured by Dow Chemical), and 670 parts by mass of ion-exchanged water are mixed, and the mixture is stirred and emulsified at 1,500 revolutions for 30 minutes by a dissolver to prepare a monomer emulsion. Subsequently, 1.10 parts by mass of Dowfax2A1 (47% solution, manufactured by Dow Chemical Co., Ltd.) and 1500 parts by mass of ion-exchanged water are charged into the reaction vessel. After heating to 75° C. under a nitrogen stream, 75 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and after further reacting for 50 minutes, the mixture is cooled to obtain PMMA particle dispersion-1 which is a dispersion of resin particles. The solid content concentration of the PMMA particle dispersion-1 is 22.8% by mass. The volume-average particle size of the resin particles is 0.42 μm, and the volume particle size distribution index (GSDv) is 1.17.

Synthesis Example 2 (Preparation of PMMA Particle Dispersion-2)

670 parts by mass of methyl methacrylate, 31.4 parts by mass of the surfactant Dowfax2A1 (47% solution, manufactured by Dow Chemical), and 670 parts by mass of ion-exchanged water are mixed, and the mixture is stirred and emulsified at 1,500 revolutions for 30 minutes by a dissolver to prepare a monomer emulsion. Subsequently, 1.10 parts by mass of Dowfax2A1 (47% solution, manufactured by Dow Chemical Co., Ltd.) and 1500 parts by mass of ion-exchanged water are charged into the reaction vessel. After heating to 75° C. under a nitrogen stream, 75 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and after further reacting for 50 minutes, the mixture is cooled to obtain PMMA particle dispersion-2 which is a dispersion of resin particles. The solid content concentration of the PMMA particle dispersion-2 is 23.2% by mass. The volume-average particle size of the resin particles is 0.33 μm, and the volume particle size distribution index (GSDv) is 1.18.

Synthesis Example 3 (Preparation of PSt Particle Dispersion-1)

670 parts by mass of styrene, 17.0 parts by mass of the surfactant Dowfax2A1 (47% solution, manufactured by Dow Chemical Co., Ltd.), and 670 parts by mass of ion-exchanged water are mixed, and the mixture is stirred and emulsified at 1,500 revolutions for 30 minutes with a dissolver to prepare a monomer emulsion. Subsequently, 1.10 parts by mass of Dowfax2A1 (47% solution, manufactured by Dow Chemical Co., Ltd.) and 1500 parts by mass of ion-exchanged water are charged into the reaction vessel. After heating to 75° C. under a nitrogen stream, 75 parts by mass of the monomer emulsion is added, and then a polymerization initiator solution in which 15 parts by mass of ammonium persulfate is dissolved in 98 parts by mass of ion-exchanged water is added dropwise over 10 minutes. After the reaction is carried out for 50 minutes after the dropping, the remaining monomer emulsion is added dropwise over 220 minutes, and the reaction is further carried out for 50 minutes and then cooled to obtain a PSt particle dispersion-1. The solid content concentration of the PSt particle dispersion-1 is 22.8% by mass. The volume-average particle size of the resin particles is 0.4 μm, and the volume particle size distribution index (GSDv) is 1.15.

Synthesis Example 4 (Preparation of PSt Particle Powder-1)

PSt particle dispersion-1 obtained in Synthesis Example 3: 100 parts by mass of resin particles (containing 338.6 parts by mass of water) in terms of solid content is freeze-dried, and the powder is taken out. After adding 20 parts by mass of deionized water to 100 parts by mass of the obtained powder and stirring, the particles are precipitated by centrifugation and the supernatant is removed. After repeating this operation three times, freeze-drying is performed again, and the PSt particle powder-1 is taken out. The volume-average particle size of the resin particles is 0.4 μm, which is the same as the volume-average particle diameter in the original dispersion.

Synthesis Example 5 (Preparation of Polyimide Precursor-A1)

160.68 parts by mass of NMP, 10.88 parts by mass of p-phenylenediamine (PDA) (molecular weight: 108.14) used as another diamine compound, and 5.67 g of diamine (molecular weight: 225.25) having a group represented by the formula (B1-6) used as a specific diamine compound are added to a reaction vessel, and the mixture is stirred at 50° C. for 10 minutes to disperse. Then, 37.01 parts by mass of 3,3',4,4'-biphenyltetracarboxylic dianhydride (BPDA) (molecular weight: 294.22) used as a tetracarboxylic dianhydride is gradually added, and the mixture is stirred for 7 hours while maintaining the reaction temperature at 50° C. to dissolve and react, thereby obtaining a polyimide precursor solution having a concentration of 25% by mass. The Mw (in terms of polystyrene) of GPC is 110,000.

This solution is added dropwise to 3 L of stirred acetone to precipitate a polyimide precursor. The obtained solid is stirred again in 1 L of acetone, collected by filtration and vacuum dried to obtain a polyimide precursor-A1.

Synthesis Examples 6 to 30 (Preparation of Polyimide Precursors-A2 to A10, A12 to A23, B1 to B7, Comparative Polyimide Precursors AC1 to AC2)

The polyimide precursors-A2 to A10, A12 to A23, B1 to B7, and the comparative polyimide precursor-AC1 to AC2 are obtained in the same manner as in Synthesis Example 5, except that the tetracarboxylic dianhydride ("TD" in Tables), other diamine compounds ("other DA" in Tables), the organic groups of the specific diamine compound ("specific DA" in Tables), the total content of the specific diamine compound relative to the total amount of the diamine compound ("vs diamine" in Tables), and the total content of the organic groups B1 to B4 with respect to the total polyimide precursor ("vs precursor" in Tables) are changed as described in Tables 1 to 5 of Examples.

The results of measuring the weight-average molecular weight Mw (in terms of polystyrene) of the obtained polyimide precursor by the above-mentioned method are shown in the table ("Mw" in the table).

In the table, in tetracarboxylic dianhydride (TD),
"BPDA" means 3,3',4,4'-biphenyltetracarboxylic dianhydride,
"PMDA" means pyromellitic anhydride, and
"ODPA" means 4,4'-oxydiphthalic anhydride.
Also, in the table, in other diamine compounds (other DA),
"PDA" means p-phenylenediamine, and
"ODA" means 4,4'-diaminodiphenyl ether.

Example A

Example A1 Aqueous Solution According to Preparation Method (i) Described Above

To a mixed solvent of 452.17 parts by mass of deionized water and 19.83 parts by mass of N-methyl-2 pyrrolidone (NMP, aprotic polar solvent), 100 parts by mass of polyimide precursor-A1 and 71.27 parts by mass of N-methylmorpholine (organic amine compound) (150 mol % with respect to the carboxyl group of polyimide precursor) are added, and the mixture is stirred to prepare a uniform solution having a concentration of 6.0% by mass of polyimide precursor-A1. This solution is mixed with 1023.38 parts by mass of a PMMA particle dispersion-1 (solid content 22.8% by mass), and the mixture is stirred at 2000 rpm for 3 minutes and at 2200 rpm for 3 minutes using a stirrer "Awatori Rentaro" (manufactured by THINKY CORPORATION) to obtain a particle-dispersed polyimide precursor solution (A1) of Example A1. The particle ratio to the sum of the polyimide precursor and the particles in this solution is 70% by mass, the total concentration of the polyimide precursor and the particles is 20% by mass, and the content of NMP to 100 parts by mass of the particles is 8.5 parts by mass.

The obtained solution is diluted with a solvent of the same composition, and the particle size distribution is measured by the method described above, the volume-average particle size (D50v) is 0.42 μm, which is a single peak as in the case of the original PMMA particle dispersion-1, and is in a good dispersion state.

Examples A2 to A10, A12 to A15, A17 to A23, Comparative Examples A1 to A2 Aqueous Solution According to Preparation Method (i) Described Above Particle-dispersed polyimide precursor solutions (A2) to (A10), (A12) to (A15), (A17) to (A23) of Examples A2 to A10, A12 to A15, and A17 to A23, and particle-dispersed polyimide precursor solutions (AC1) to (AC2) of Comparative Examples A1 and A2 are obtained in the same manner as in Example A1, except that the type of polyimide precursor used, the type of organic amine compound ("amine" in Tables), the type of particle dispersion, the particle ratio to the sum of the polyimide precursor and the particles ("particle ratio" in Tables), the type of solvent other than water ("solvent 2" in Tables), and the content of solvent 2 to 100 parts by mass of the particles ("amount of solvent 2" in Tables) are changed as described in Tables 1 to 4 of Examples.

The total concentration of the polyimide precursor and the particles in the obtained particle-dispersed polyimide precursor solution is shown in Tables ("solid content" in Tables).

In the table, in the organic amine compounds,
"MMO" means N-methylmorpholine,
"DMAEt" means dimethylaminoethanol, "DMIz" means 1,2-dimethylimidazole, and
"2E4Miz" means 2-ethyl-4-methylimidazole.

Further, in the table, in the type of particle dispersion,
"PMMA liquid 1" means PMMA particle dispersion-1,
"PMMA liquid 2" means PMMA particle dispersion-2, and
"PSt liquid 1" means PSt particle dispersion-1.

Further, in the table, in the solvent other than water (solvent 2),
"NMP" means N-methyl-2-pyrrolidone (aprotic polar solvent),
"DMAc" means N,N-dimethylacetamide (aprotic polar solvent),
"DMSO" means dimethyl sulfoxide (aprotic polar solvent),
"IPA" means isopropyl alcohol (protic polar solvent), and
"PGME" means 1-methoxy-2-propanol (protic polar solvent).

Example A11 Aqueous Solution According to Preparation Method (ii) Described Above 1127.88 parts by mass of PSt particle dispersion-1 (solid content: 22.8% by mass), 64.21 parts by mass of deionized water, and 64.29 parts by mass of NMP are added to a reaction vessel, and the mixture is stirred under a nitrogen stream. Thereto, 21.89 parts by mass of p-phenylenediamine (PDA) (molecular weight: 108.14), 8.05 parts by mass of diamine B1-7 (diamine derived from specific example B1-7), and 70.07 parts by mass of 3,3',4,4'-biphenyltetracarboxylic dianhydride (BPDA) (molecular weight: 294.22) are added. Thereto, 72.27 parts by mass of N-methylmorpholine (organic amine compound) (150 mol % with respect to the carboxyl groups of the polyimide precursor to be produced) is slowly added, and the mixture is stirred at a reaction temperature of 50° C. for 24 hours to obtain a particle-dispersed polyimide precursor solution (A11) of Example A11. The particle ratio to the total of the polyimide precursor and the particles in this solution is 72% by mass, the total concentration of the polyimide precursor and the particles is 25% by mass, and the ratio of NMP to the particles is 25% by mass. The Mw (in terms of polystyrene) of GPC is 40,000.

The obtained solution is diluted with a solvent of the same composition, and the particle size distribution is measured by the method described above, the volume-average particle size (D50v) is 0.40 μm, which is a single peak as in the case of the original PSt particle dispersion-1, and is in a good dispersion state.

The total concentration of the polyimide precursor and the particles in the obtained particle-dispersed polyimide precursor solution is shown in Tables ("solid content" in Tables).

Example A16 Aqueous Solution According to Preparation Method (i) Described Above A particle-dispersed polyimide precursor solution (A16) of Example A16 is obtained in the same manner as Example A1 except that an aqueous dispersion of silica particles (SEA-HOSTER KE-W 50 manufactured by Nippon Shokubai Co., Ltd., volume-average particle size 0.5 μm, solid content 20%) is used in place of the PMMA particle dispersion-1, and the type of polyimide precursor and the content of aprotic polar solvent to 100 parts by mass of the particles ("amount of solvent 2" in Tables) are changed are described in Table 3 of Examples.

The total concentration of the polyimide precursor and the particles in the obtained particle-dispersed polyimide precursor solution is shown in Tables ("solid content" in Tables).

Example B

Example B1 Organic Solvent Solution According to Preparation Method (i) Described Above To a mixed solvent of 179.57 parts by mass of ethylene glycol (EG) and 119.72 parts by mass of DMAc, 100 parts by mass of polyimide precursor-B1 are added and stirred to prepare a uniform solution having a concentration of 25% by mass of polyimide precursor-B1.

Separately, 2.33 parts by mass of polyoxyethylene dodecyl ether and 233.33 parts by mass of PSt particle powder-1 are added to a mixed solvent of 419.01 parts by mass of ethylene glycol (EG) and 279.34 parts by mass of DMAc, and the mixture is stirred at 2000 rpm for 3 minutes and at 2200 rpm for 3 minutes by using a stirring device "Awatori Rentaro" (manufactured by THINKY CORPORATION) to prepare a dispersion having a PSt particle concentration of 25% by mass.

The above two solutions are mixed and stirred at 2000 rpm for 3 minutes and 2200 rpm for 3 minutes using a stirrer "Awatori Rentaro" (manufactured by THINKY CORPORATION) to obtain the particle-dispersed polyimide precursor solution (B1) of Example B1. The particle ratio to the sum of the polyimide precursor and the particles in this solution is 70% by mass, the mass ratio of EG/DMAc as the solvent is 60/40, and the total concentration of the polyimide precursor and the particles is 25% by mass.

The obtained solution is diluted with a solvent of the same composition, and the particle size distribution is measured by the method described above, the volume-average particle size (D50v) is 0.4 μm, which is a single peak as in the case of the original PSt particle powder-1, and is in a good dispersion state.

Examples B2 to B7 Organic Solvent Solution According to Preparation Method (i)

The particle-dispersed polyimide precursor solutions (B2) to (B7) of Examples B2 to B7 are obtained in the same manner as Example B1, except that the type of polyimide precursor used, the particle ratio to the sum of the polyimide precursor and the particles ("particle ratio" in Tables), and the type of solvent and the mass ratio thereof ("Solvent 1", "Solvent 2" and "Solvent 1/Solvent 2" in Tables) are changed as described in Table 5 of Examples.

The total concentration of the polyimide precursor and the particles in the obtained particle-dispersed polyimide precursor solution is shown in Tables ("solid content" in Tables).

In the table, in the solvent 1 and the solvent 2,
"EG" means ethylene glycol,
"PG" means propylene glycol,
"DMAc" means N,N-dimethylacetamide, and
"DMSO" means dimethyl sulfoxide.

Evaluation

Evaluation of Particle Dispersion State of Particle-Dispersed Polyimide Precursor Solution The frequency distribution of the particle size immediately after the solution is prepared is measured by the above method. From this result (horizontal axis: particle size, vertical axis: frequency), the volume-average particle size D50v (μm) of the particles based on the above definition is calculated. Further, the ratio (unit: %, hereinafter also referred to as "area ratio of other peaks") of the peak area of other peaks to the total peak area is determined by defining the peak having the largest local maximum value (that is, the largest local maximum frequency) as a main peak, and defining peaks other than the main peak as other peaks when there are two or more local maximum values. In a case where there is only one local maximum value in the total distribution, the area ratio of other peaks is set to zero. In each of the examples and comparative examples, the area ratio of other peaks is zero immediately after the solution is prepared.

The particle-dispersed polyimide precursor solution is stored in a constant temperature bath at 40° C. for 2 weeks, and then the same evaluation as above is performed.

The volume-average particle size D50v of the particles immediately after preparation of the particle-dispersed polyimide precursor solutions ("immediately after D50v" in Tables), the volume-average particle size D50v of the particles after storage ("aged D50v" in Tables), and the ratios of other peak areas after storage ("area ratio of other peaks" in Tables) are shown in Tables.

The increase in the volume-average particle size D50v and area ratio of other peaks after aging indicates that the dispersion state of the particles deteriorates.

Dispersion State of Dried Film after Aging of Solution

The particle-dispersed polyimide precursor solutions after aging as described above are applied to glass base material using applicators adjusted to a gap of 0.3 mm, and dried at 70° C. for 1 hour to prepare a 10 cm square dried film (that is, film).

The surface of the dried film is observed by SEM (manufactured by Hitachi High-Technologies Corporation) at a magnification of 5000 to 30000 times. At least 100 particles are observed from a plurality of regions, and the dispersion state of the particles is evaluated according to the following criteria. The results are shown in Tables ("dried film dispersion" in Tables).

Evaluation Criteria

A+: A change in shape is observed in less than 5% of the observed particles, but there is no aggregation of the particles.

A: Fusion is seen in less than 5% of the observed particles.

B: Aggregation is observed in less than 5 to 20% of the observed particles.

C: Aggregation is observed in 20% or more of the observed particles.

TABLE 1

| | | Example A1 | Comparative Example A1 | Comparative Example A2 | Example A2 | Example A3 | Example A4 | Example A5 |
|---|---|---|---|---|---|---|---|---|
| Polyimide precursor | Type | A1 | AC1 | AC2 | A2 | A3 | A4 | A5 |
| | TD | BPDA | BPDA | BPDA | BPDA | BPDA | BPDA | BPDA |
| | Specific DA | B1-6 | — | B1-6 | B1-7 | B1-9 | B1-10 | B1-12 |
| | Other DA | PDA | PDA | PDA | PDA | PDA | PDA | PDA |
| | vs diamine (mol %) | 20 | 0 | 95 | 25 | 30 | 25 | 35 |
| | vs precursor (% by mass) | 10.6 | 0 | 41.7 | 13 | 15.4 | 15.5 | 18.8 |
| | vs particles (parts by mass) | 4.5 | 0 | 17.9 | 5.6 | 6.6 | 6.6 | 8.1 |
| | Mw | 110,000 | 105,000 | 110,000 | 105,000 | 120,000 | 105,000 | 115,000 |
| Amine | Type | MMO | MMO | MMO | DMAEt | MMO | MMO | DMAEt |
| Particles | Type | PMMA liquid 1 | PMMA liquid 1 | PMMA liquid 1 | PMMA liquid 1 | PMMA liquid 1 | PMMA liquid 1 | PMMA liquid 2 |
| | D50v (μm) | 0.42 | 0.42 | 0.42 | 0.42 | 0.42 | 0.33 | 0.33 |
| | Particle ratio (% by mass) | 70 | 70 | 70 | 70 | 70 | 70 | 70 |
| Solvent | Solvent 1 | water | water | water | water | water | water | water |
| | Solvent 2 | NMP | NMP | NMP | NMP | DMAc | NMP | NMP |
| | Solvent 2 amount (parts by mass) | 8.5 | 8.5 | 8.5 | 15 | 20 | 22.5 | 22.5 |
| | Solid content (% by mass) | 20 | 20 | 20 | 20 | 20 | 20 | 20 |
| | Preparation method | i | i | i | i | i | i | I |
| Evaluation | Immediately after D50v (μm) | 0.42 | 0.42 | 0.63 | 0.42 | 0.42 | 0.33 | 0.33 |
| | Aged D50v (μm) | 0.47 | 0.55 | 0.79 | 0.42 | 0.42 | 0.35 | 0.33 |
| | Ratio of other peaks (%) | 2 | 5 | 8 | 0 | 0 | 0 | 0 |
| | Dried film dispersion | A | C | C | A+ | A+ | A+ | A+ |

Table 2

| | | Example A6 | Example A7 | Example A8 | Example A9 | Example A10 | Example A11 | Example A12 |
|---|---|---|---|---|---|---|---|---|
| Polyimide precursor | Type | A6 | A7 | A8 | A9 | A10 | A11 | A12 |
| | TD | BPDA | BPDA | BPDA | BPDA | BPDA | BPDA | BPDA |
| | Specific DA | B2-3 | B2-12 | B3-3 | B4-2 | B4-11 | B1-7 | B1-1 |
| | Other DA | PDA | PDA | PDA | PDA | PDA | PDA | PDA |
| | vs diamine (mol %) | 30 | 20 | 25 | 30 | 30 | 25 | 65 |
| | vs precursor (% by mass) | 21.7 | 19.5 | 18.6 | 21.7 | 26.1 | 13 | 30.5 |
| | vs particles (parts by mass) | 9.3 | 8.3 | 8 | 9.3 | 11.2 | 5.1 | 13.1 |

Table 2-continued

|  |  | Example A6 | Example A7 | Example A8 | Example A9 | Example A10 | Example A11 | Example A12 |
|---|---|---|---|---|---|---|---|---|
| Amine | Mw | 115,000 | 120,000 | 110,000 | 105,000 | 120,000 | 40,000 | 125,000 |
|  | Type | MMO | MMO | DMIz | MMO | 2E4MIz | MMO | MMO |
| Particles | Type | PMMA liquid 2 | PSt liquid 1 | PSt liquid 1 | PSt liquid 1 | PSt liquid 1 | PSt liquid 1 | PSt liquid 1 |
|  | D50v (μm) | 0.33 | 0.4 | 0.4 | 0.4 | 0.4 | 0.4 | 0.4 |
|  | Particle ratio (% by mass) | 70 | 70 | 70 | 70 | 70 | 72 | 70 |
| Solvent | Solvent 1 | water | water | water | water | water | water | Water |
|  | Solvent 2 | DMAc | NMP | NMP | DMSO | NMP | NMP | NMP |
|  | Solvent 2 amount (parts by mass) | 22.5 | 22.5 | 22.5 | 22.5 | 22.5 | 25 | 22.5 |
|  | Solid content (% by mass) | 20 | 20 | 20 | 20 | 20 | 25 | 20 |
|  | Preparation method | i | i | i | i | i | i | i |
| Evaluation | Immediately after D50v (μm) | 0.33 | 0.4 | 0.4 | 0.4 | 0.4 | 0.4 | 0.4 |
|  | Aged D50v (μm) | 0.33 | 0.43 | 0.4 | 0.4 | 0.42 | 0.4 | 0.42 |
|  | Ratio of other peaks (%) | 0 | 0 | 0 | 0 | 0 | 0 | 0 |
|  | Dried film dispersion | A+ | A+ | A+ | A+ | A+ | A+ | A+ |

TABLE 3

|  |  | Example A13 | Example A14 | Example A15 | Example A16 | Example A17 | Example A18 | Example A19 |
|---|---|---|---|---|---|---|---|---|
| Polyimide precursor | Type | A13 | A14 | A15 | A16 | A17 | A18 | A19 |
|  | TD | BPDA | BPDA | BPDA | BPDA | BPDA | BPDA | BPDA |
|  | Specific DA | B1-1 | B3-5 | B4-4 | B1-6 | B1-6 | B1-6 | B1-6 |
|  | Other DA | PDA | PDA | PDA | PDA | PDA | PDA | PDA |
|  | vs diamine (mol %) | 75 | 25 | 20 | 25 | 30 | 25 | 25 |
|  | vs precursor (% by mass) | 34.4 | 20 | 16.4 | 13 | 15.4 | 13 | 13 |
|  | vs particles (parts by mass) | 51.5 | 37.1 | 49.3 | 5.6 | 6.6 | 5.6 | 5.6 |
| Amine | Mw | 125,000 | 120,000 | 115,000 | 125,000 | 100,000 | 115,000 | 110,000 |
|  | Type | MMO | MMO | MMO | MMO | MMO | MMO | MMO |
| Particles | Type | PSt liquid 1 | PSt liquid 1 | PSt liquid 1 | Silica | PSt liquid 1 | PSt liquid 1 | PSt liquid 1 |
|  | D50v (μm) | 0.4 | 0.4 | 0.4 | 0.5 | 0.4 | 0.4 | 0.4 |
|  | Particle ratio (% by mass) | 40 | 35 | 25 | 70 | 70 | 70 | 72 |
| Solvent | Solvent 1 | water | water | water | water | water | water | water |
|  | Solvent 2 | NMP | DMSO | NMP | NMP | NMP | IPA | PGME |
|  | Solvent 2 amount (parts by mass) | 30 | 30 | 30 | 30 | 12 | 30 | 30 |
|  | Solid content (% by mass) | 20 | 20 | 20 | 20 | 20 | 20 | 20 |
|  | Preparation method | i | i | i | i | i | i | i |
| Evaluation | Immediately after D50v (μm) | 0.4 | 0.4 | 0.4 | 0.3 | 0, 4 | 0.4 | 0.4 |
|  | Aged D50v (μm) | 0.44 | 0.43 | 0.45 | 0.3 | 0.44 | 0.4 | 0.4 |
|  | Ratio of other peaks (%) | 2 | 0 | 2 | 3 | 0 | 0 | 0 |
|  | Dried film dispersion | A | A+ | A | A | A+ | A | A |

TABLE 4

|  |  | Example A20 | Example A21 | Example A22 | Example A23 |
|---|---|---|---|---|---|
| Polyimide precursor | Type | A20 | A21 | A22 | A23 |
|  | TD | BPDA | PMDA | ODPA | BPDA |
|  | Specific DA | B1-6 | B1-6 | B1-6 | B1-6 |
|  | Other DA | PDA | ODA | PDA | PDA |
|  | vs diamine (mol %) | 25 | 25 | 25 | 25 |
|  | vs precursor (% by mass) | 12.3 | 13.3 | 12.6 | 13 |
|  | vs particles (parts by mass) | 5.3 | 5.7 | 5.4 | 5.6 |
|  | Mw | 120,000 | 105,000 | 115,000 | 110,000 |

TABLE 4-continued

|  |  | Example A20 | Example A21 | Example A22 | Example A23 |
|---|---|---|---|---|---|
| Amine | Type | MMO | MMO | MMO | MMO |
| Particles | Type | PSt liquid 1 | PSt liquid 1 | PSt liquid 1 | PSt liquid 1 |
|  | D50v (μm) | 0.4 | 0.4 | 0.4 | 0.4 |
|  | Particle ratio (% by mass) | 70 | 70 | 70 | 70 |
| Solvent | Solvent 1 | water | water | water | water |
|  | Solvent 2 | NMP | DMSO | DMAc | NMP |
|  | Solvent 2 amount (parts by mass) | 39 | 45 | 53 | 3.5 |
|  | Solid content (% by mass) | 20 | 20 | 20 | 20 |
|  | Preparation method | i | i | i | i |
| Evaluation | Immediately after D50v (μm) | 0.4 | 0.4 | 0.4 | 0.4 |
|  | Aged D50v (μm) | 0.42 | 0.44 | 0.47 | 0.46 |
|  | Ratio of other peaks (%) | 0 | 1 | 3 | 2 |
|  | Dried film dispersion | A+ | A | A | A |

TABLE 5

|  |  | Example B1 | Example B2 | Example B3 | Example B4 | Example B5 | Example B6 | Example B7 |
|---|---|---|---|---|---|---|---|---|
| Polyimide precursor | Type | B1 | B2 | B3 | B4 | B5 | B6 | B7 |
|  | TD | PMDA | PMDA | PMDA | PMDA | BPDA | BPDA | BPDA |
|  | Specific DA | B1-2 | B1-15 | B2-1 | B2-9 | B4-1 | B4-7 | B4-14 |
|  | Other DA | ODA | ODA | ODA | ODA | PDA | PDA | PDA |
|  | vs diamine (mol %) | 30 | 30 | 30 | 25 | 35 | 30 | 20 |
|  | vs precursor (% by mass) | 16.6 | 16.7 | 22.2 | 22.1 | 24.6 | 25.3 | 19.7 |
|  | vs particles (parts by mass) | 7.1 | 7.2 | 9.5 | 9.5 | 8.2 | 13.6 | 8.4 |
|  | Mw | 110,000 | 120,000 | 130,000 | 140,000 | 150,000 | 160,000 | 170,000 |
| Particles | Type | PSt liquid 1 | PSt liquid 1 | PSt liquid 1 | PSt liquid 1 | PSt liquid 1 | PSt liquid 1 | PSt liquid 1 |
|  | D50v (μm) | 0.4 | 0.4 | 0.4 | 0.4 | 0.4 | 0.4 | 0.4 |
|  | Particle ratio (% by mass) | 70 | 70 | 70 | 70 | 75 | 65 | 70 |
| Solvent | Solvent 1 | EG | EG | EG | EG | PG | EG | triglyme |
|  | Solvent 2 | DMAc | DMAc | DMAc | DMSO | DMSO | DMSO | DMAc |
|  | Solvent 1/solvent 2 | 60/40 | 65/35 | 65/35 | 65/35 | 75/25 | 70/30 | 65/35 |
|  | Solid content (% by mass) | 25 | 30 | 30 | 25 | 25 | 25 | 30 |
|  | Preparation method | i | i | i | i | i | i | i |
| Evaluation | Immediately after D50v (μm) | 0.4 | 0.4 | 0.4 | 0.4 | 0.4 | 0.4 | 0.4 |
|  | Aged D50v (μm) | 0.4 | 0.44 | 0.42 | 0.45 | 0.43 | 0.44 | 0.43 |
|  | Ratio of other peaks (%) | 0 | 1 | 0 | 1 | 0 | 2 | 1 |
|  | Dried film dispersion | A | A | A+ | A | A+ | A | A |

From the above results, it may be seen that in Examples, the change in the particle size of the particles over time is suppressed, and the dispersion stability of the particles in the particle-dispersed polyimide precursor solution is excellent, as compared with Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A particle-dispersed polyimide precursor solution comprising:

a polyimide precursor having a unit represented by the following formula (I);

particles; and a solvent, wherein the particle-dispersed polyimide precursor solution satisfies both the following conditions (1) and (2),

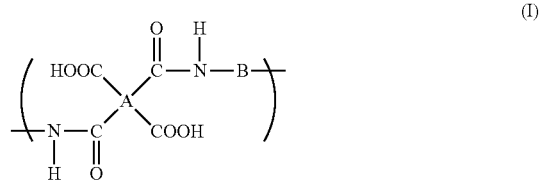

(in the formula (I), A represents a tetravalent organic group, and B represents a divalent organic group represented by any of the following formulas (B1) to (B4)),

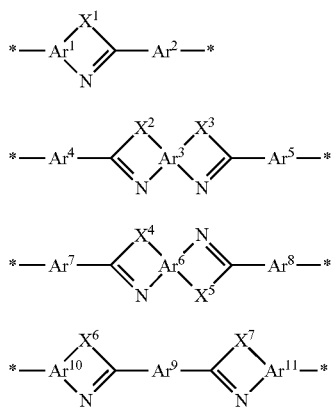

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and $Ar^8$ each independently represent a divalent aromatic group which may have a substituent, $Ar^3$ and $Ar^6$ each independently represent a tetravalent aromatic group which may have a substituent or a group represented by the following formula (II), $Ar^9$ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

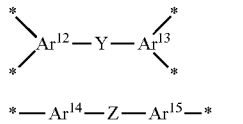

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, S(=O)$_2$, or CRbRc, Rb and Rc each independently represent a hydrogen atom, an alkyl group which may have a substituent, or an aryl group, and * represents a bonding site with an adjacent linking group), Condition (1): a total content of the groups represented by the formulas (B1) to (B4) is 1% by mass or more and 40% by mass or less with respect to a total amount of the polyimide precursor, and Condition (2): a content of the particles is 5% by mass or more and 90% by mass or less with respect to a total content of the polyimide precursor and the particles.

2. The particle-dispersed polyimide precursor solution according to claim 1,
wherein the total content of the groups represented by the formulas (B1) to (B4) is 3% by mass or more and 30% by mass or less with respect to the total amount of the polyimide precursor.

3. The particle-dispersed polyimide precursor solution according to claim 1,
wherein the total content of the groups represented by the formulas (B1) to (B4) is 1 part by mass or more and 50 parts by mass or less with respect to 100 parts by mass of the particles.

4. The particle-dispersed polyimide precursor solution according to claim 2,
wherein the total content of the groups represented by the formulas (B1) to (B4) is 1 part by mass or more and 50 parts by mass or less with respect to 100 parts by mass of the particles.

5. The particle-dispersed polyimide precursor solution according to claim 3,
wherein the total content of the groups represented by the formulas (B1) to (B4) is 5 parts by mass or more and 40 parts by mass or less with respect to 100 parts by mass of the particles.

6. The particle-dispersed polyimide precursor solution according to claim 4,
wherein the total content of the groups represented by the formulas (B1) to (B4) is 5 parts by mass or more and 40 parts by mass or less with respect to 100 parts by mass of the particles.

7. A particle-dispersed polyimide precursor solution comprising:
a polyimide precursor having a unit represented by the following formula (I);
particles; and
a solvent,
wherein the particle-dispersed polyimide precursor solution satisfies both the following conditions (3) and (4),

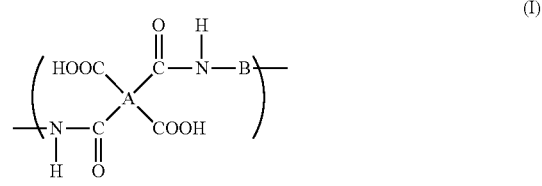

(in the formula (I), A represents a tetravalent organic group, and B represents a divalent organic group represented by any of the following formulas (B1) to (B4)),

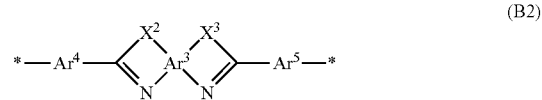

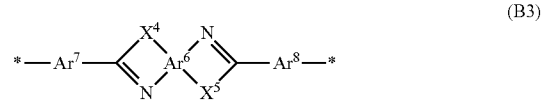

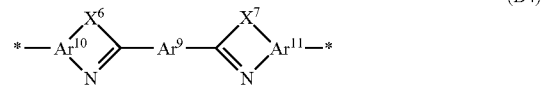

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and Ar⁸ each independently represent a divalent aromatic group which may have a substituent, Ar³ and Ar⁶ each independently represent a tetravalent aromatic group which may have a substituent or a group represented by the following formula (II), Ar⁹ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

(II)

(III)

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, S(=O)₂, or CRbRc, Rb and Rc each independently represent a hydrogen atom, an alkyl group which may have a substituent, or an aryl group, and * represents a bonding site with an adjacent linking group), Condition (3): a total content of the groups represented by the formulas (B1) to (B4) is 1 part by mass or more and 50 parts by mass or less with respect to 100 parts by mass of the particles, and Condition (4): a content of the particles is 5% by mass or more and 90% by mass or less with respect to a total content of the polyimide precursor and the particles.

8. The particle-dispersed polyimide precursor solution according to claim 7,
wherein the total content of the groups represented by the formulas (B1) to (B4) is 5 parts by mass or more and 40 parts by mass or less with respect to 100 parts by mass of the particles.

9. The particle-dispersed polyimide precursor solution according to claim 1,
wherein the groups represented by the formulas (B1) to (B4) are groups represented by the following formulas (B1a) to (B4a), respectively, Formula (B1a)

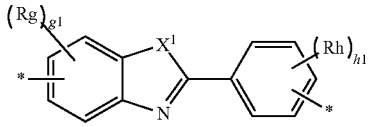

Formula (B2a)

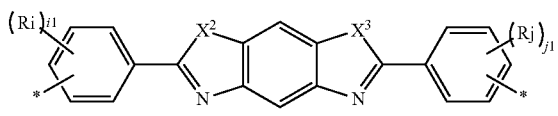

Formula (B3a)

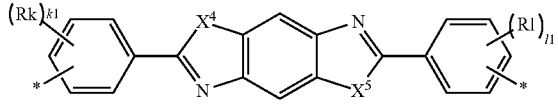

Formula (B4a)

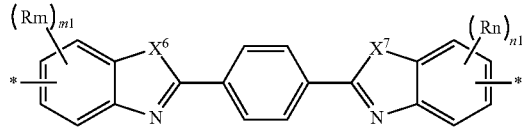

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

10. The particle-dispersed polyimide precursor solution according to claim 2,
wherein the groups represented by the formulas (B1) to (B4) are groups represented by the following formulas (B1a) to (B4a), respectively, Formula (B1a)

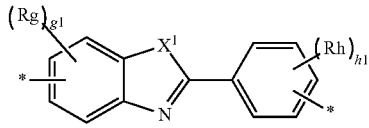

Formula (B2a)

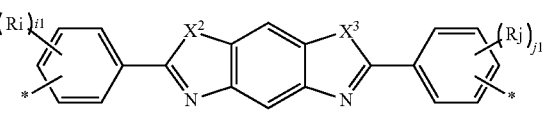

Formula (B3a)

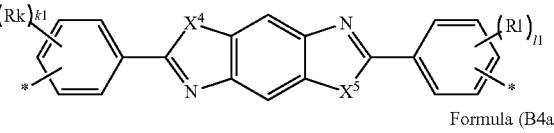

Formula (B4a)

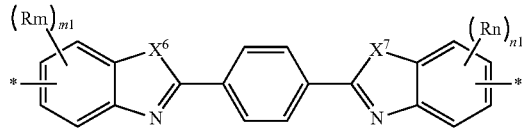

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

11. The particle-dispersed polyimide precursor solution according to claim 3,
wherein the groups represented by the formulas (B1) to (B4) are groups represented by the following formulas (B1a) to (B4a), respectively, Formula (B1a)

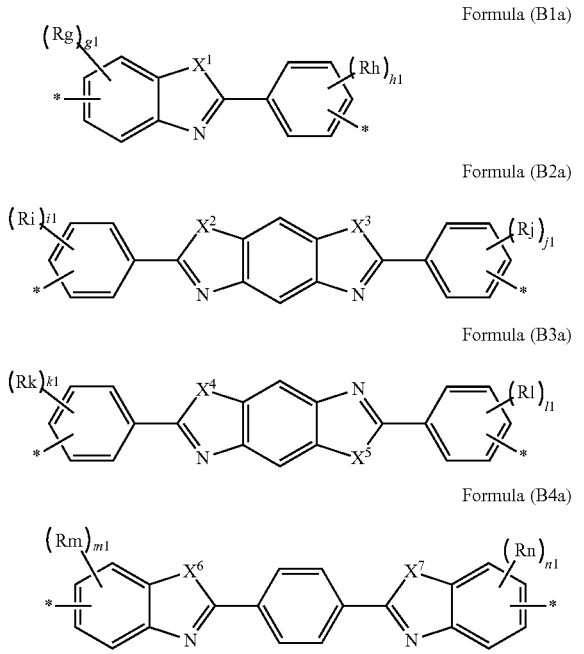

Formula (B2a)

Formula (B3a)

Formula (B4a)

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

12. The particle-dispersed polyimide precursor solution according to claim 4, wherein the groups represented by the formulas (B1) to (B4) are groups represented by the following formulas (B1a) to (B4a), respectively, Formula (B1a)

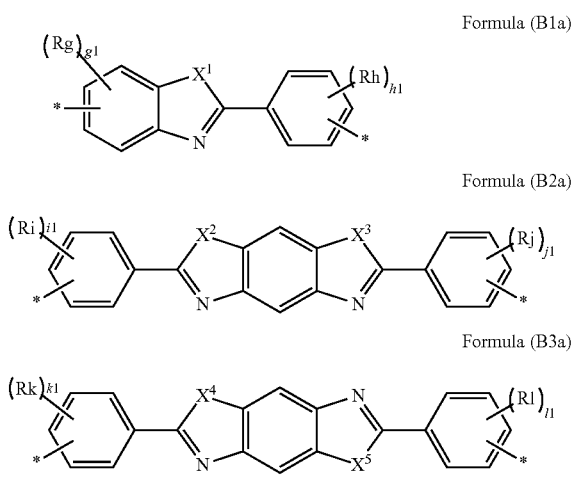

Formula (B2a)

Formula (B3a)

Formula (B4a)

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

13. The particle-dispersed polyimide precursor solution according to claim 5, wherein the groups represented by the formulas (B1) to (B4) are groups represented by the following formulas (B1a) to (B4a), respectively, Formula (B1a)

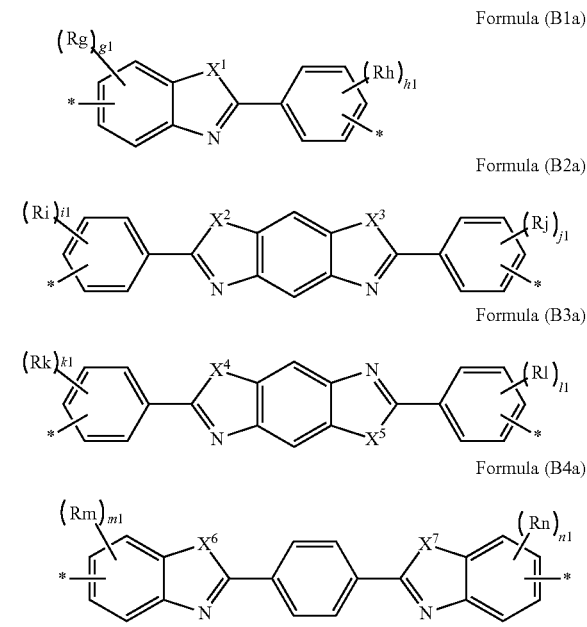

Formula (B2a)

Formula (B3a)

Formula (B4a)

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

14. The particle-dispersed polyimide precursor solution according to claim 6, wherein the groups represented by the formulas (B1) to (B4) are groups represented by the following formulas (B1a) to (B4a), respectively, Formula (B1a)

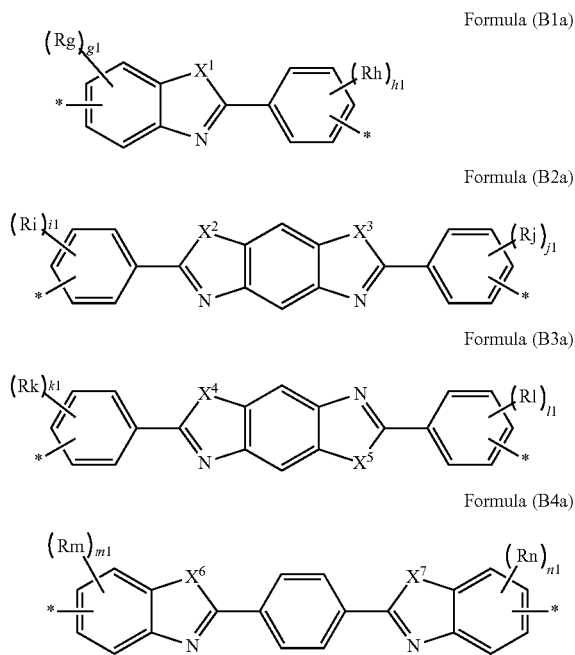

Formula (B2a)

Formula (B3a)

Formula (B4a)

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

15. The particle-dispersed polyimide precursor solution according to claim 7,
wherein the groups represented by the formulas (B1) to (B4) are groups represented by the following formulas (B1a) to (B4a), respectively, Formula (B1a)

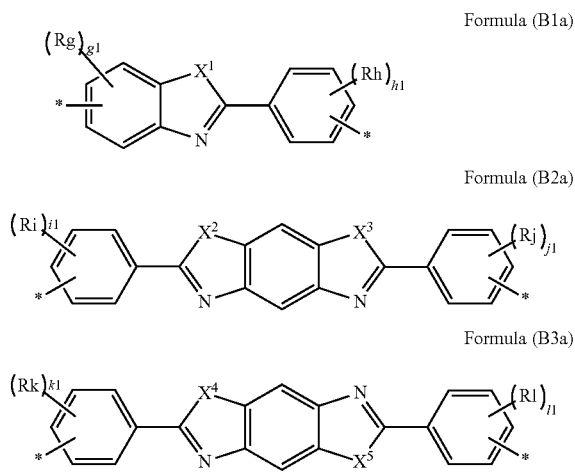

Formula (B2a)

Formula (B3a)

Formula (B4a)

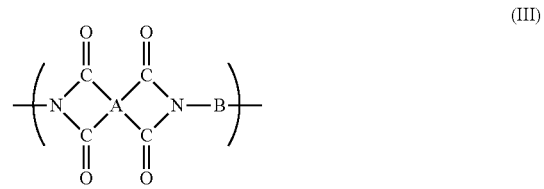

(in the formulas (B1a) to (B4a), Rg, Rh, Ri, Rj, Rk, Rl, Rm, and Rn each independently represent an alkyl group, an alkoxy group, a halogen atom or an aryl group, g1, m1 and n1 each independently represent an integer of 0 to 3, h1, i1, j1, k1 and l1 each independently represent an integer of 0 to 4, $X^1$ to $X^7$ each independently represent NRa, O, or S, Ra represents a hydrogen atom, an alkyl group which may have a substituent, or an aryl group, and * represents a bonding site with an adjacent linking group).

16. The particle-dispersed polyimide precursor solution according to claim 1,
wherein the particles are resin particles.

17. The particle-dispersed polyimide precursor solution according to claim 1, further comprising:
an organic amine compound,
wherein the solvent contains water, and a content of the water is 50% by mass or more with respect to a total amount of the solvent.

18. The particle-dispersed polyimide precursor solution according to claim 17,
wherein the solvent further contains an aprotonic polar solvent, and a content of the aprotonic polar solvent is 5 parts by mass or more and 50 parts by mass or less with respect to 100 parts by mass of the particles.

19. A method for producing a porous polyimide film, comprising:
applying the particle-dispersed polyimide precursor solution according to claim 1 on a substrate to form a coating film, and then drying the coating film to form a film containing the polyimide precursor and the particles; and
heating the film to imidize the polyimide precursor to form a polyimide film, and performing a process of removing the particles.

20. A porous polyimide film comprising:
a polyimide having a unit represented by the following formula (III),
wherein the porous polyimide film has pores and satisfies the following condition (5), (III)

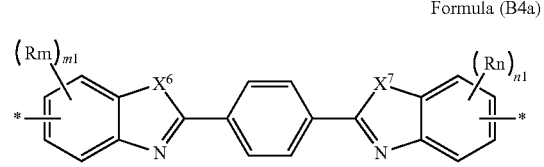

(in the formula (III), A represents a tetravalent organic group, and B represents a divalent organic group represented by any of the following formulas (B1) to (B4)),

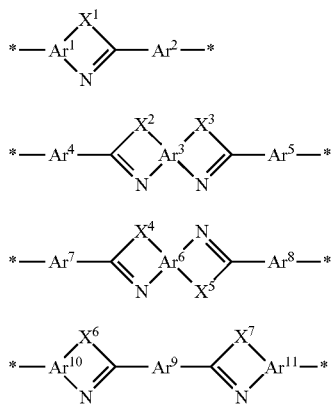

(B1)
(B2)
(B3)
(B4)

(in the formulas (B1) to (B4), $Ar^1$, $Ar^{10}$, and $Ar^{11}$ each independently represent a trivalent aromatic group which may have a substituent, $Ar^2$, $Ar^4$, $Ar^5$, $Ar^7$ and $Ar^8$ each independently represent a divalent aromatic group which may have a substituent, $Ar^3$ and $Ar^6$ each independently represent a tetravalent aromatic group which may have a substituent or a group represented by the following formula (II), $Ar^9$ represents a divalent aromatic group which may have a substituent or a group represented by the following formula (III), $X^1$ to $X^7$ each independently represent NRa, O, or S, Ra represents a hydrogen atom, an alkyl group which may have a substituent, or an aryl group, and * represents a bonding site with an adjacent linking group), and

(II)
(III)

(in the formulas (II) and (III), $Ar^{12}$ and $Ar^{13}$ each independently represent a trivalent aromatic group which may have a substituent, $Ar^{14}$ and $Ar^{15}$ each independently represent a divalent aromatic group which may have a substituent, Y and Z each independently represent O, S, $S(=O)_2$, or CRbRc, Rb and Rc each independently represent a hydrogen atom, an alkyl group which may have a substituent, or an aryl group, and * represents a bonding site with an adjacent linking group), Condition (5): a total content of the groups represented by the formulas (B1) to (B4) is 1% by mass or more and 40% by mass or less with respect to a total amount of the polyimide.

* * * * *